United States Patent
Huizenga et al.

(10) Patent No.: US 12,478,897 B2
(45) Date of Patent: Nov. 25, 2025

(54) SYSTEMS AND METHODS FOR FLUID DISTILLATION

(71) Applicant: On Point Distillation LLC, Elm Grove, WI (US)

(72) Inventors: Steven Huizenga, Flossmoor, IL (US); Jeromy M. Betzler, Blaine, MN (US); Donald St. George, Elm Grove, WI (US)

(73) Assignee: On Point Distillation LLC, Elm Grove, WI (US)

( * ) Notice: Subject to any disclaimer, the term of this patent is extended or adjusted under 35 U.S.C. 154(b) by 642 days.

(21) Appl. No.: 17/892,923

(22) Filed: Aug. 22, 2022

(65) Prior Publication Data

US 2023/0058801 A1    Feb. 23, 2023

Related U.S. Application Data

(60) Provisional application No. 63/235,576, filed on Aug. 20, 2021.

(51) Int. Cl.
  *B01D 3/10*     (2006.01)
  *B01D 11/02*    (2006.01)

(52) U.S. Cl.
  CPC ............ *B01D 11/0234* (2013.01); *B01D 3/10* (2013.01); *B01D 11/0207* (2013.01)

(58) Field of Classification Search
  CPC .... B01D 3/10; B01D 11/0234; B01D 11/0207
  See application file for complete search history.

(56) References Cited

U.S. PATENT DOCUMENTS

| 2,308,008 A | 1/1943 | Hickman |
| 2,538,967 A | 1/1951 | Hickman |

(Continued)

FOREIGN PATENT DOCUMENTS

| CN | 112105429 A | 12/2020 |
| CN | 113018888 A | 6/2021 |
| WO | 2019239915 A1 | 12/2019 |

OTHER PUBLICATIONS

Inchem Corp., InChem's Thin Film & Molecular Distillation Equipment Separates and Concentrates, https://inchemcorp.com/thin-film-distillation.html, Accessed on Feb. 9, 2021, 2 pages.

(Continued)

*Primary Examiner* — Jonathan Miller
(74) *Attorney, Agent, or Firm* — Quarles & Brady LLP

(57) ABSTRACT

Systems and methods provide distillation systems and associated distillation methods. A distillation system can include a distillation chamber for distilling a biomass. A heat source can be applied to the distillation chamber to heat the biomass. A source of vacuum can be applied to the distillation chamber to remove a solvent from the distillation chamber. A magnetically driven spinner apparatus can be positioned within the distillation chamber and including at least a first paddle for generating a splash agitation of the biomass in the distillation chamber, wherein the magnetically driven spinner apparatus does not extend through any wall of the distillation chamber. A drive assembly can include a motor to cause rotational movement of the magnetically driven spinner apparatus within the distillation chamber.

20 Claims, 20 Drawing Sheets

(56) References Cited

U.S. PATENT DOCUMENTS

| | | | |
|---|---|---|---|
| 3,271,272 | A | 9/1966 | Watt |
| 3,334,680 | A | 8/1967 | McManus |
| 4,257,945 | A * | 3/1981 | Martel .................... C11B 9/027 426/651 |
| 5,308,452 | A | 5/1994 | Marks et al. |
| 5,385,645 | A | 1/1995 | Li |
| 7,955,476 | B2 | 6/2011 | Mansur |
| 10,596,486 | B2 * | 3/2020 | Nevitt .................. C07D 311/92 |
| 10,688,410 | B2 | 6/2020 | Dimitrelos et al. |
| 10,850,212 | B1 | 12/2020 | Gokay et al. |
| 2005/0232074 | A1 | 10/2005 | Higashihara et al. |
| 2015/0175463 | A1 | 6/2015 | Joensen |
| 2016/0228787 | A1 | 8/2016 | Payack |
| 2018/0140965 | A1 * | 5/2018 | Flora ......................... C11B 1/10 |
| 2019/0083902 | A1 * | 3/2019 | Nevitt ................. B01D 11/0257 |
| 2019/0160443 | A1 | 5/2019 | Cauley, III et al. |
| 2020/0054962 | A1 | 2/2020 | Vanaman et al. |

OTHER PUBLICATIONS

Vashee et al., Thermal Separation with Thin Film and Short Path Distillation, Feb. 7, 2011, 17 pages.
PCT International Search Report and Written Opinion, PCT/US2022/041090, Nov. 15, 2022, 11 pages.
European Patent Office, Extended European Search Report, Application No. 22859263.0, Jun. 11, 2025, 9 pages.

* cited by examiner

SYSTEMS AND METHODS FOR FLUID DISTILLATION

CROSS-REFERENCES TO RELATED APPLICATIONS

This application claims priority to U.S. Patent Application No. 63/235,576, titled "Systems and Methods for Fluid Distillation" and filed Aug. 20, 2021, the entirety of which is incorporated herein by reference.

BACKGROUND

The present disclosure relates generally to fluid distillation, and, more specifically, to fluid distillation systems and methods where both the distilled liquid, e.g., a biomass, and the remaining product can be captured for use or reuse.

The basic process of distillation is well known and is regarded as the most effective way to separate toxins, bacteria, chemicals, and solids from liquids to produce a substantially pure liquid. For example, distillation can be used to produce clean drinking water, or to remove solvents from liquid mixtures, and there are countless other distillation applications. One form of a distillation system heats a feed liquid, and the resultant vapors are drawn off in order to separate and remove contaminants. The vapor is typically condensed to produce a substantially pure liquid, for example drinkable water.

BRIEF SUMMARY

In some aspects, the present disclosure provides a distillation system comprising a distillation chamber for distilling a biomass; a heat source to produce heat, the heat to be applied to the distillation chamber to heat the biomass; a source of vacuum, the vacuum to be applied to the distillation chamber to remove a solvent from the distillation chamber; a magnetically driven spinner apparatus, the magnetically driven spinner apparatus positioned within the distillation chamber and including a shaft, and at least a first paddle for generating a splash agitation of the biomass in the distillation chamber, wherein the magnetically driven spinner apparatus does not extend through any wall of the distillation chamber; and a drive assembly, the drive assembly including a motor to cause rotational movement of the magnetically driven spinner apparatus within the distillation chamber.

In some aspects, the drive assembly is a magnetic drive assembly, the magnetic drive assembly including at least a first drive magnet to cause the rotational movement of the magnetically driven spinner apparatus within the distillation chamber.

In some aspects, the magnetically driven spinner apparatus includes at least a first spinner magnet; and wherein a magnetic field is generated between the at least a first spinner magnet and the at least a first drive magnet such that rotational movement of the at least a first drive magnet causes the at least a first spinner magnet to follow the movement of the magnetic field, which causes the spinner apparatus to spin within the distillation chamber as the at least a first drive magnet rotates.

In some aspects, the distillation system can further include at least a second paddle for generating the splash agitation of the biomass in the distillation chamber.

In some aspects, the at least a first paddle includes a top surface, an inner side surface, an outer side surface, a bottom surface, a first ramped surface extending downward from the top surface, and a second ramped surface opposite the first ramped surface extending downward from the top surface, the top surface and/or the bottom surface including one or more shape variations to direct and agitate the flow of the biomass across the top surface and/or the bottom surface.

In some aspects, the present disclosure provides a distillation system comprising a distillation chamber for distilling a biomass, the distillation chamber including an intake hole for the biomass, an outlet for a distillate, and a vapor outlet hole for a vaporized solvent; a heat source to produce heat, the heat from the heat source to be applied to the distillation chamber to heat the biomass; a source of vacuum, the vacuum to be applied to the distillation chamber through the vapor outlet hole to remove the vaporized solvent from the distillation chamber; a magnetically driven spinner apparatus, the magnetically driven spinner apparatus positioned within the distillation chamber and including at least a first spinner magnet, and at least a first paddle for generating a splash agitation of the biomass in the distillation chamber; and a magnetic drive assembly, the magnetic drive assembly including a motor and at least a first drive magnet movable by the motor; wherein a magnetic field is generated between the first spinner magnet and the first drive magnet and through the distillation chamber such that rotational movement of the first drive magnet causes the first spinner magnet to follow the rotational movement of the first drive magnet and the magnetic field, which causes the spinner apparatus to spin within the distillation chamber as the first drive magnet rotates; and wherein neither of the magnetic drive assembly and the magnetically driven spinner apparatus extend through any wall of the distillation chamber.

In some aspects, the distillation system can further include at least a second paddle for generating the splash agitation of the biomass in the distillation chamber.

In some aspects, the magnetically driven spinner apparatus further includes a shaft; a driven magnet support bar coupled to an upper portion of the shaft; the at least a first spinner magnet and at least a second spinner magnet coupled to the driven magnet support bar; a paddle support bar coupled to a lower portion of the shaft; and the at least a first paddle and at least a second paddle coupled to the paddle support bar.

In some aspects, the distillation system can further include a bearing apparatus positioned on the shaft; and the bearing apparatus supported by a receiver in the distillation chamber to allow the shaft to maintain its location in a center position of the distillation chamber and spin within the distillation chamber.

In some aspects, the distillation chamber includes a cover, the cover further including a float switch hole and vapor probe hole, the float switch hole to hold a float switch located in the distillation chamber, and the vapor probe hole to hold a vapor temperature sensor.

In some aspects, the first paddle includes a top surface, an inner side surface, an outer side surface, a bottom surface, a first ramped surface extending downward from the top surface, and a second ramped surface opposite the first ramped surface extending downward from the top surface, the top surface and/or the bottom surface including one or more shape variations to direct and agitate the flow of the biomass across the top surface and/or the bottom surface.

In some aspects, the magnetic drive assembly further includes a shaft coupled to the motor; a magnet support bar coupled to a portion of the shaft; and the at least a first drive magnet and at least a second drive magnet coupled to the magnet support bar.

In some aspects, the present disclosure provides a distillation system comprising a distillation chamber for distilling a biomass, the distillation chamber including an intake hole for the biomass, an outlet for a distillate, and a vapor outlet hole for a vaporized solvent; a heat source to produce heat, the heat from the heat source to be applied to the distillation chamber to heat the biomass; a source of vacuum, the vacuum to be applied to the distillation chamber through the vapor outlet hole to remove the vaporized solvent from the distillation chamber; and a spinner apparatus, the spinner apparatus positioned within the distillation chamber and including a shaft, a paddle support bar coupled to the shaft, and at least a first paddle and a second paddle coupled to the paddle support bar, and a bearing apparatus positioned on the shaft below the paddle support bar supported by a receiver in the distillation chamber to allow the shaft of the spinner apparatus to maintain its location in a center position of the distillation chamber and spin within the distillation chamber; wherein the at least a first paddle includes a first paddle top surface, and at least a first paddle first ramped surface extending downward from the first paddle top surface, and the at least a second paddle includes a second paddle top surface, and at least a second paddle first ramped surface extending downward from the second paddle top surface; wherein at least one of the first paddle top surface and the second paddle top surface include at least one shape variation to direct the flow of the biomass across the at least one of the first paddle top surface and second paddle top surface; and a drive assembly, the drive assembly including a motor to cause rotational movement of the spinner apparatus within the distillation chamber.

In some aspects, the distillation system can further include a predefined space between the at least a first paddle and an inside surface of the distillation chamber, such that the at least a first paddle does not contact the inside surface of the distillation chamber.

In some aspects, the spinner apparatus includes at least a first spinner magnet, and the drive assembly includes at least a first drive magnet; and a magnetic field generated between the at least a first spinner magnet and the at least a first drive magnet and through the distillation chamber such that rotational movement of the at least a first drive magnet causes the at least a first spinner magnet to follow the movement of the magnetic field, which causes the spinner apparatus to spin within the distillation chamber as the at least a first drive magnet rotates.

In some aspects, the first paddle includes a top surface, an inner side surface, an outer side surface, a bottom surface, a first ramped surface extending downward from the top surface, and a second ramped surface opposite the first ramped surface extending downward from the top surface, the top surface and/or the bottom surface including one or more shape variations to direct and agitate the flow of the biomass across the top surface and/or the bottom surface.

In some aspects, the one or more shape variations include at least one of one or more ribs on the top surface with gaps positioned between the ribs, and one or more cavities within the bottom surface.

In some aspects, the one or more shape variations include one or more angled blades extending upward from the top surface, and/or one or more angled blades extending downward from the bottom surface.

In some aspects, the spinner apparatus rotates within the distillation chamber, and the at least a first paddle and the second paddle move through the biomass to scoop the biomass up and direct it across and through the one or more shape variations to produce a centrifugal force on the biomass and an agitation of the biomass to move the biomass within the distillation chamber.

In some aspects, the at least a first paddle is heated via a fluid flow through a channel formed in the at least a first paddle.

In some aspects, the present disclosure provides a method for distilling a biomass, the method comprising at least some of the steps including supplying the biomass to a distillation chamber; applying a vacuum to the distillation chamber; applying heat to the distillation chamber to boil the biomass; agitating the biomass using a magnetically driven spinner apparatus; drawing the solvent vapor out of the distillation chamber; condensing the solvent vapor to a liquid solvent; storing the condensed liquid solvent in a container; moving the remaining distillate out of the distillation chamber; and storing the distillate in a container.

The foregoing and other aspects and advantages of the disclosure will appear from the following description. In the description, reference is made to the accompanying drawings, which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
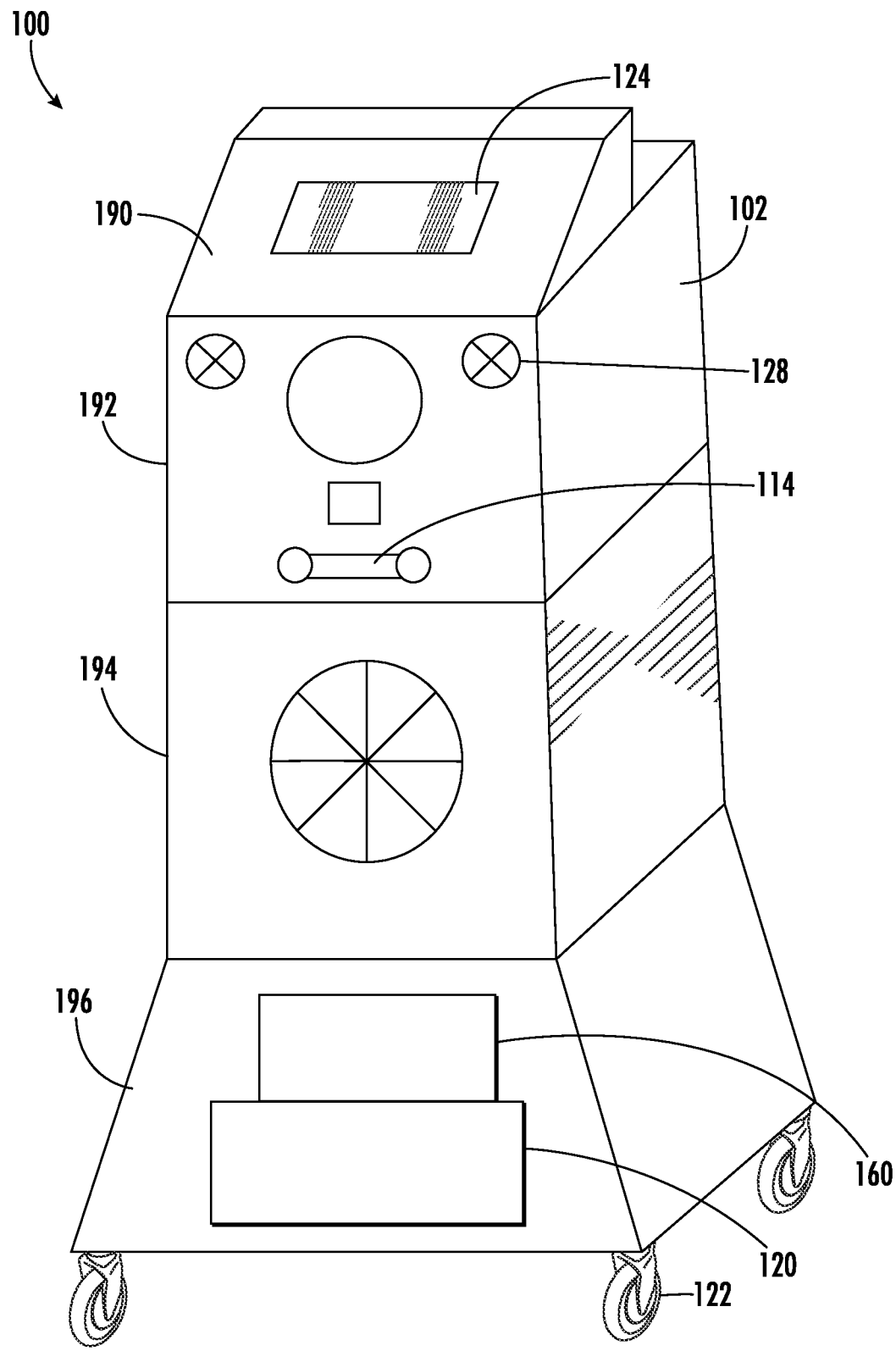
FIG. 1 is a front-left side perspective view of a distillation system, according to aspects of the present disclosure.

Before any aspects of the invention are explained in detail, it is to be understood that the invention is not limited in its application to the details of construction and the arrangement of components set forth in the following description or illustrated in the following drawings. The invention is capable of other aspects and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 2:
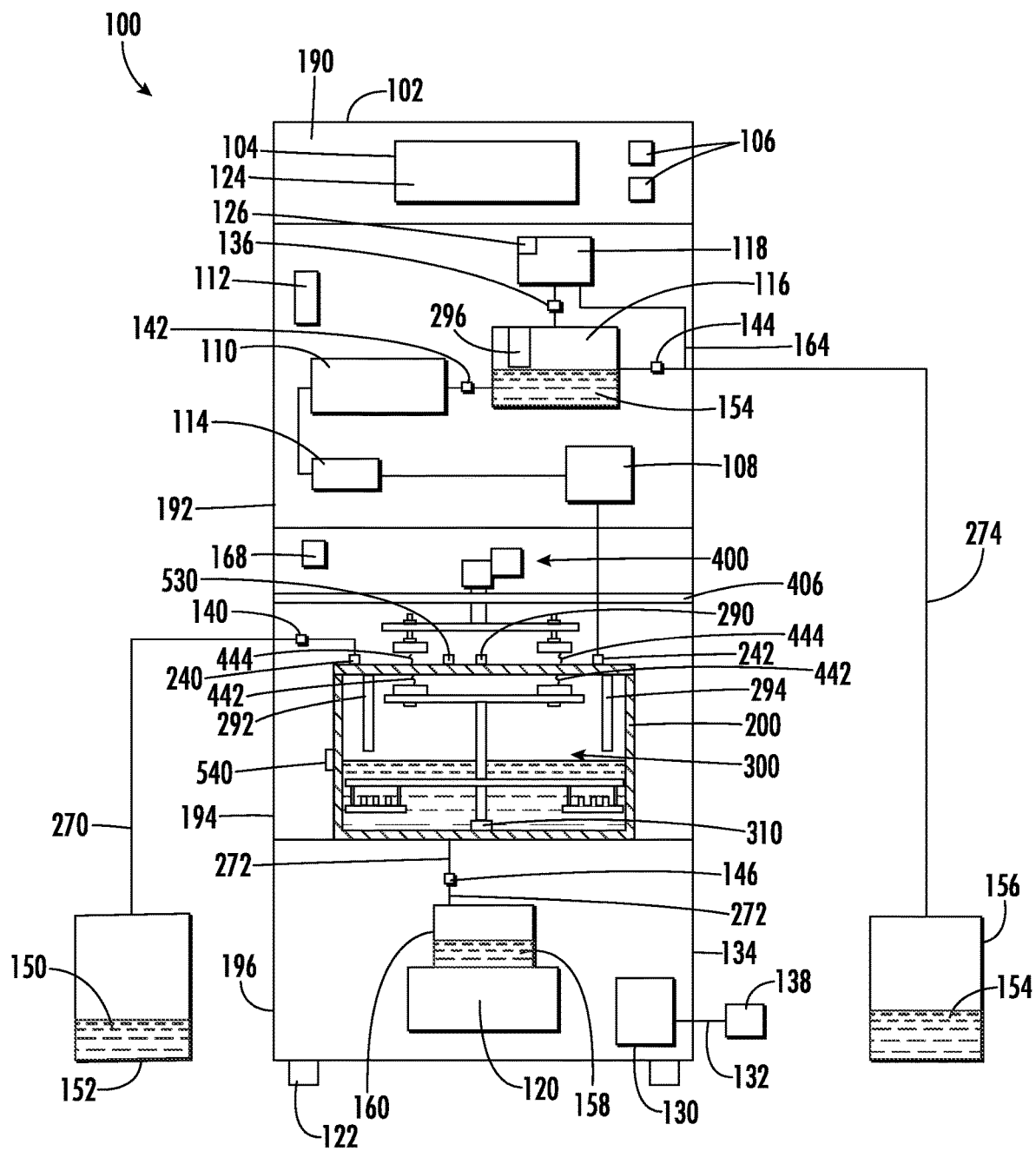
FIG. 2 is a front interior elevation view in partial section of the distillation system of FIG. 1 and a section view of a spinner apparatus, according to aspects of the present disclosure.

Referring to FIGS. 1 and 2, a distillation system 100 can include a distillation system housing 102, a Programmable Logic Controller (PLC) 104, control switches 106, wheels 122 supporting and allowing the distillation system housing 102 and all its components on and/or within to be moved, a power supply 130, and an electrical cord 132 to connect the power supply 130 to an external alternating current (AC) or direct current (DC) power source.

The distillation system 100 can be equipped with a biomass intake tube 270 connecting a biomass storage container 152 and an inlet 240 of a distillation chamber 200. An intake valve 140 can be electrically or mechanically controlled by the PLC 104 to allow a biomass 150 in the biomass storage container 152 to enter the distillation chamber 200. In some embodiments, a unit 194 can contain the distillation chamber 200, a drive assembly 400, and a spinner apparatus 300 within the distillation chamber 200 that can be driven, e.g., rotated, by the drive assembly 400. The drive assembly 400 can be supported, e.g., with a bracket 406, above or below the distillation chamber 200 to drive the spinner apparatus 300 within the distillation chamber 200.

With continued reference to FIG. 2, the distillation system 100 may include a base unit 196 comprising a distillate storage container 160, and in some embodiments, a heating mantle 120, on which the distillate storage container 160 can be positioned. In some embodiments, the distillate storage container 160 and the heating mantle 120 can be external to the distillation system housing 102. The distillate storage container 160 and the distillation chamber 200 can be in fluid flow connection by a distillate drain tubing 272. A distillate valve 146 can be controlled by the PLC 104 to allow a distillate 158 to flow from the distillation chamber 200 and be collected in the distillate storage container 160. In some embodiments, the base unit 196 can have an open side or an access door, for example, for removal of the distillate storage container 160.

Additionally, the distillation system 100 can include a unit 192 comprising a condenser 108 that can be in fluid flow connection to the distillation chamber outlet 242, a chiller 110 that can be in fluid flow connection to the condenser 108, a fan 112 that can be positioned to move air within the unit 192, and around the condenser 108 and chiller 110, a sight gauge 114 that can be in fluid flow connection to the chiller 110, a pre-accumulator valve 142 that can be controlled by the PLC 104 to allow a solvent 154 in a liquid form to travel through the sight gauge 114, an accumulator tank 116 can be in fluid flow connection to the sight gauge 114, and a source of vacuum, such as vacuum pump 118 can be coupled to the accumulator tank 116. A desired amount of the solvent 154 from the accumulator tank 116 can be allowed to flow into a solvent storage container 156 when a distillation output valve 144 is controlled, e.g., by the PLC 104, to open.

In some embodiments, the distillation system 100 can operate by drawing a liquid, e.g., the biomass 150 from the biomass storage container 152 into the distillation chamber 200 and heating the biomass 150 under vacuum to its boiling point. The solvent 154 in the biomass 150 can have a lower point than the distillate 158 in the biomass, which causes the solvent 154 to boil first, creating a solvent vapor 174, and leaving behind the distillate 158. The solvent vapor 174 can be captured and is drawn through the chiller 110 and the condenser 108 where it can be cooled and returned to its liquid state as solvent 154, and eventually returned to the solvent storage container 156. The distillate remaining in the distillation chamber 200 can be directed to the distillate storage container 160.

In some embodiments, the PLC 104 and/or the control switches 106 can provide the ability for a user to adapt the distillation system 100 to control any user specific distillation applications. Generally, the PLC 104, which can include a touchscreen display 124, and in some embodiments, the control switches 106 can be positioned on or in the distillation system housing 102, or in some embodiments, in a convenient user-accessible location such as in a control box 190. The power supply 130 of the distillation system 100 can be powered by an external 120 volt or 240 volt single phase AC power source, for example, or a 12 or 24 volt DC power source, for example, which could be both internal or external to the distillation system 100, and the power supply 130 can be plugged into an external power source outlet, or it can be wired directly to a power source by a qualified electrician. In some embodiments, the distillation system can be equipped with a 12-gauge heavy duty 8-foot electrical cord 132, and a twist lock plug 138 and associated external receptacle can be used, as a non-limiting example. In some embodiments, the distillation system housing 102 can be equipped with one or more vents and/or one or more exhaust openings 128 to dissipate excess heat, and the distillation system housing 102 and can be constructed of stainless steel and/or other metals, for example, to make it resistant to heat and chemicals.

The distillation system can be electronically operated and can be fully automated by use of the PLC 104. The PLC 104 can be calibrated (programmed) to optimize an ability of the distillation system 100 to extract the solvent 154 in a controlled fashion, e.g., to the greatest extent possible. The PLC 104 can control all aspects of the valves, including valve timing, vacuum pump, temperature settings, motors, spinner apparatus drive motors, and liquid and vapor movement from one location to another, to and from and within the distillation system 100, for various aspects of the distillation process. Inputs from one or more sensors can be used by the PLC 154 to control and/or adjust the distillation process. In some embodiments, distillation temperatures can be measured using a temperature sensor 540 and can be controlled to reach as high as approximately 400 degrees Fahrenheit (204 degrees Celsius) for certain applications, although other temperatures are contemplated. The PLC 104 can further be programmed to display alerts and other messages on the touchscreen display 124 for various indications including the presence of water, under filling, lack of programmed vacuum, overheating, and process completed, as non-limiting examples. In some embodiments, an internal thermal breaker 168 can be incorporated into the distillation system 100. For example, the PLC 104 can be programmed to shut the distillation system 100 down if the internal thermal breaker 168 senses a temperature rise past a predetermined set point.

In some embodiments, the PLC 104 can be programmed to run the distillation system 100 for between one and a half to four hours, or more or less, to complete an entire distillation cycle, and the PLC 104 can be programmed to automatically, or with user intervention, start a new distillation cycle. For some distillation applications, the distillation system 100 can draw in approximately two gallons, or three gallons, or five gallons, or more or less, of the biomass 150 at a time and can return close to 100 percent of solvent 154 and distillate 158 to the user, where close is defined to mean within about 0.05 percent. Some applications may return less than 100 percent of solvent 154. In some embodiments, the PLC 104 can be programmed to display an error code on the PLC display, and the distillation system 100 can shut down if the distillation chamber 200 does not fill to a predetermined amount of biomass 150 within a predetermined time frame.

When the distillation system 100 is turned on, the vacuum pump 118 can be powered to create a vacuum in the accumulator tank 116 and thus, drawing vacuum through the condenser 108, the chiller 110, and the distillation chamber 200. Intake valve 140 can open, thereby allowing the biomass 150 to enter the distillation chamber 200. In some embodiments, once a desired vacuum pressure is reached, heat can be applied to the biomass 150 via a heat source 224, 226, thereby heating the distillation chamber 200 and/or paddles 322 and 338. The flow of biomass 150 into the distillation chamber 200 can stop when the float switch 292 inside the distillation chamber senses a desired depth, and the intake valve 140 can be controlled to close. The solvent vapor 174 produced from the boiling solvent 154 can travel through the condenser 108 and the chiller 110 where it is cooled back to liquid solvent 154, and can continue through the sight gauge 114, and into the accumulator tank 116. When the solvent 154 is boiled off, the distillation output valve 144 can be controlled by the PLC 104 to open, as the pre-accumulator valve 142 closes, and a small amount of compressed air can be pushed into the accumulator tank 116 thereby forcing the solvent 154 into the solvent storage container 156. Pre-accumulator valve 142 can open and compressed air can be used to push the distillate 158 in the distillation chamber 200 into the distillate storage container 160.

The distillation system 100 can be configured to require minimal user servicing. In some embodiments, user servicing can include the changing of an inlet filter (not shown) on a predetermined frequency basis, although the inlet filter may not be required in all embodiments. In some embodiments, the distillation system 100 can integrate wired or wireless remote access and monitoring of the system via the PLC 104. Additionally, the distillation system 100 can be cleaned using standard cleaning methods.

As a non-limiting example, the base unit 196 of the distillation system 100 can measure approximately 24 inches by 18 inches, although other dimensions are contemplated to various applications. The distillation system 100 can be approximately 60 inches tall, or more or less, and can be portable with the use of wheels 122, for example lockable casters. The distillation system 100 size and wheels 122 allow for simple movement, operation, and storage of the distillation system 100. The distillation system 100 can weigh approximately 90 pounds, or more or less. In some embodiments and for various applications, the distillation system housing 102 can be differently shaped, sized, and/or oriented than the illustrated distillation system housing 102 in FIGS. 1 and 2.

Figure 3:
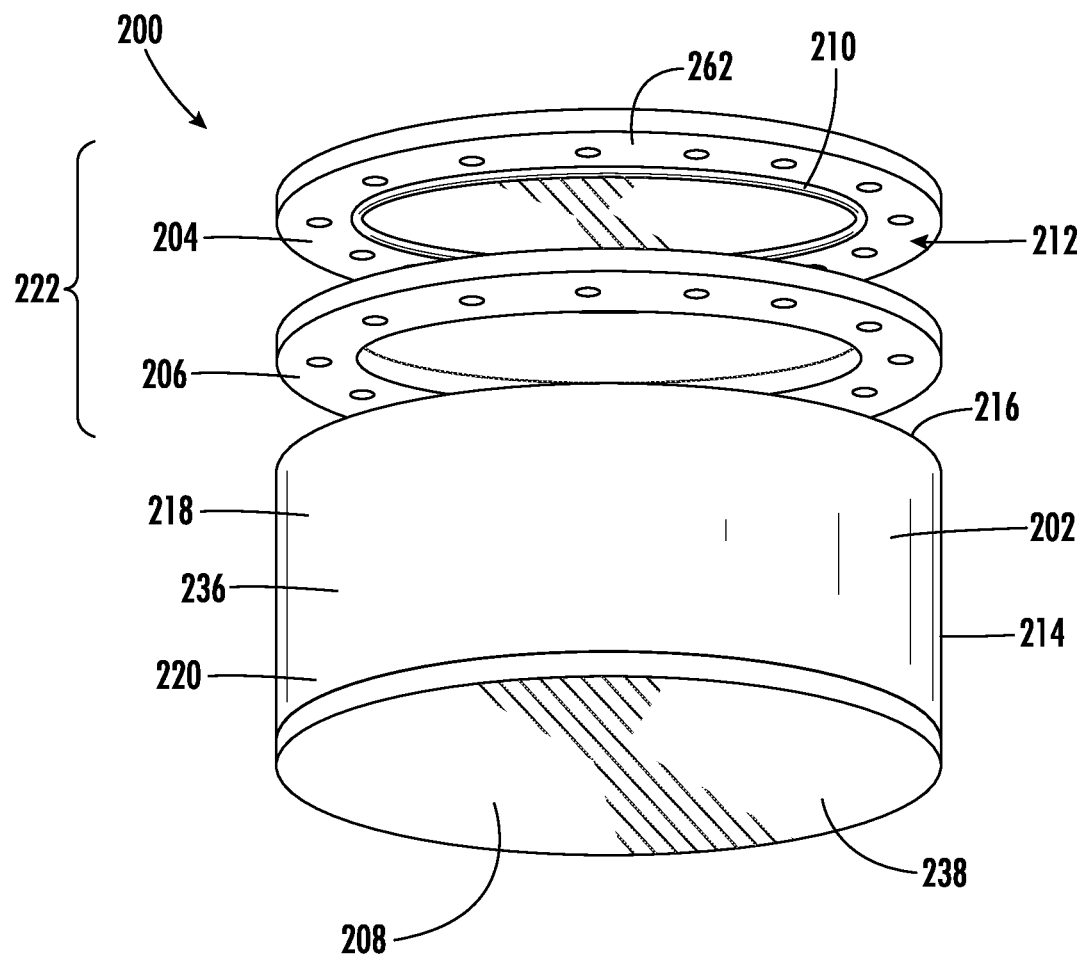
FIG. 3 illustrates an exploded bottom perspective view of the distillation chamber of FIG. 2, according to aspects of the present disclosure.

Referring to FIG. 3, some embodiments of the distillation chamber 200 can comprise a distillation chamber body 202, a first plate 204, and a ring 206 coupled to a top side 218 of the distillation chamber body 202, and a bottom side 220. In some embodiments, bottom side 220 of the distillation chamber 200 can comprise a second plate 208 coupled to the distillation chamber body 202. The distillation chamber body 202 can be generally hollow and can have a chamber wall 236 that extends from an outside surface 214 of the distillation chamber body 202 to an inside surface 216 of the distillation chamber body 202. The non-limiting example shown in FIG. 3 shows the distillation chamber 200 in a cylindrical shape. However, other shapes or configurations are possible.

In some embodiments, the first plate 204 and the ring 206 may have through holes 212 that can receive fasteners (not shown). For example, the first plate 204 may have sixteen evenly spaced through holes with an exemplary size of ¼-20, and the ring 206 may have sixteen evenly spaced tapped holes with an exemplary size of ¼-20. In addition, the first plate 204, or the ring 206, can include a sealing gasket 210, e.g., an O-ring, on a side that can be flush with a side of the ring 206.

Figure 4:
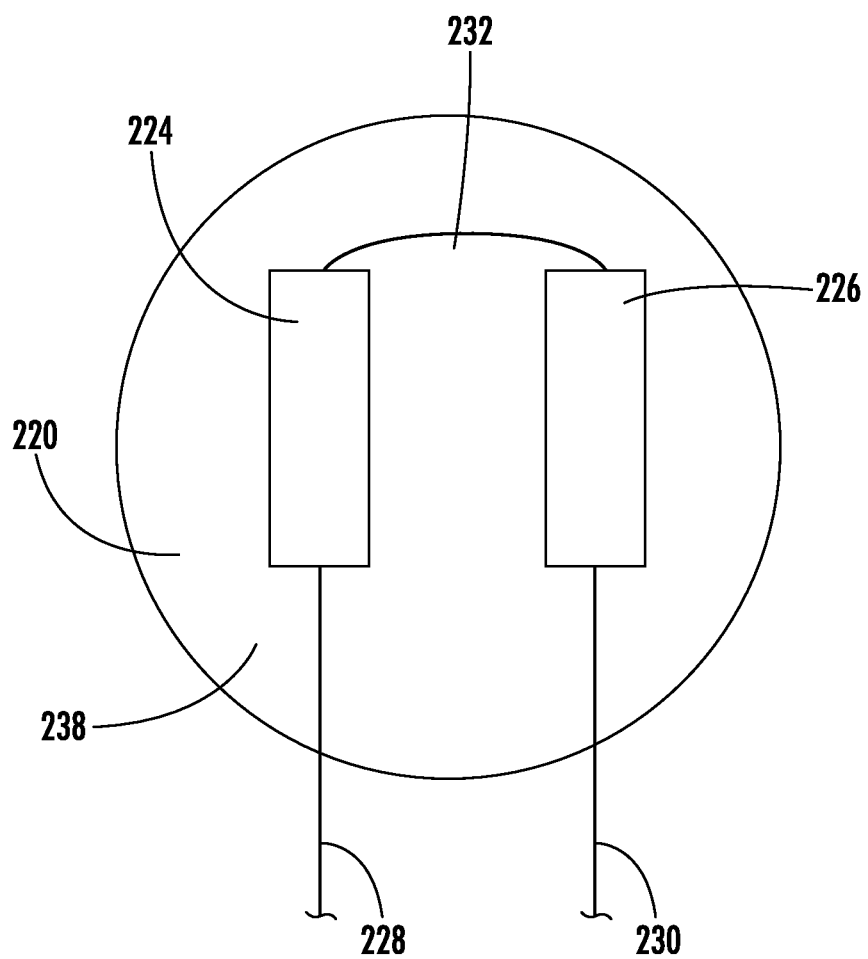
FIG. 4 is a bottom view of the distillation chamber of FIG. 2 including exemplary heaters, according to aspects of the present disclosure.

FIG. 4 shows an exemplary bottom view of the distillation chamber 200, showing an exemplary heat source 224, 226, to heat the distillation chamber 200. In some embodiments, the heat source can include one or more strip heaters, e.g., a first strip heater 224 and a second strip heater 226, coupled to the outer side 238 of the bottom side 220 of the distillation chamber 200. As a non-limiting example, two ten inch by two inch strip heaters with a power of approximately 750 watts can be used, although other types and wattages are contemplated. At least the first strip heater 224 and the second strip heater 226 can heat the distillation chamber 200, which can thus heat the biomass 150 inside the distillation chamber 200. The first strip heater 224 and the second strip heater 226 can be electronically connected by a jumper wire 232. A first wire 228 linked to the first strip heater 224, and a second wire 230 linked to the second strip heater 226 can be electrically coupled to the PLC 104 for control of the heating of the biomass 150. In some embodiments, the first strip heater 224 and/or the second strip heater 226 can be positioned, e.g., generally horizontally, on the outside surface 214 of the distillation chamber body 202 (see FIG. 5). In some embodiments, other desired heater arrangements are possible, such as including a generally vertical arrangement of a heater or heaters, or an arrangement with more than two heaters, or an arrangement with heaters on the bottom side 238 and on the outside surface 214.

Figure 5:
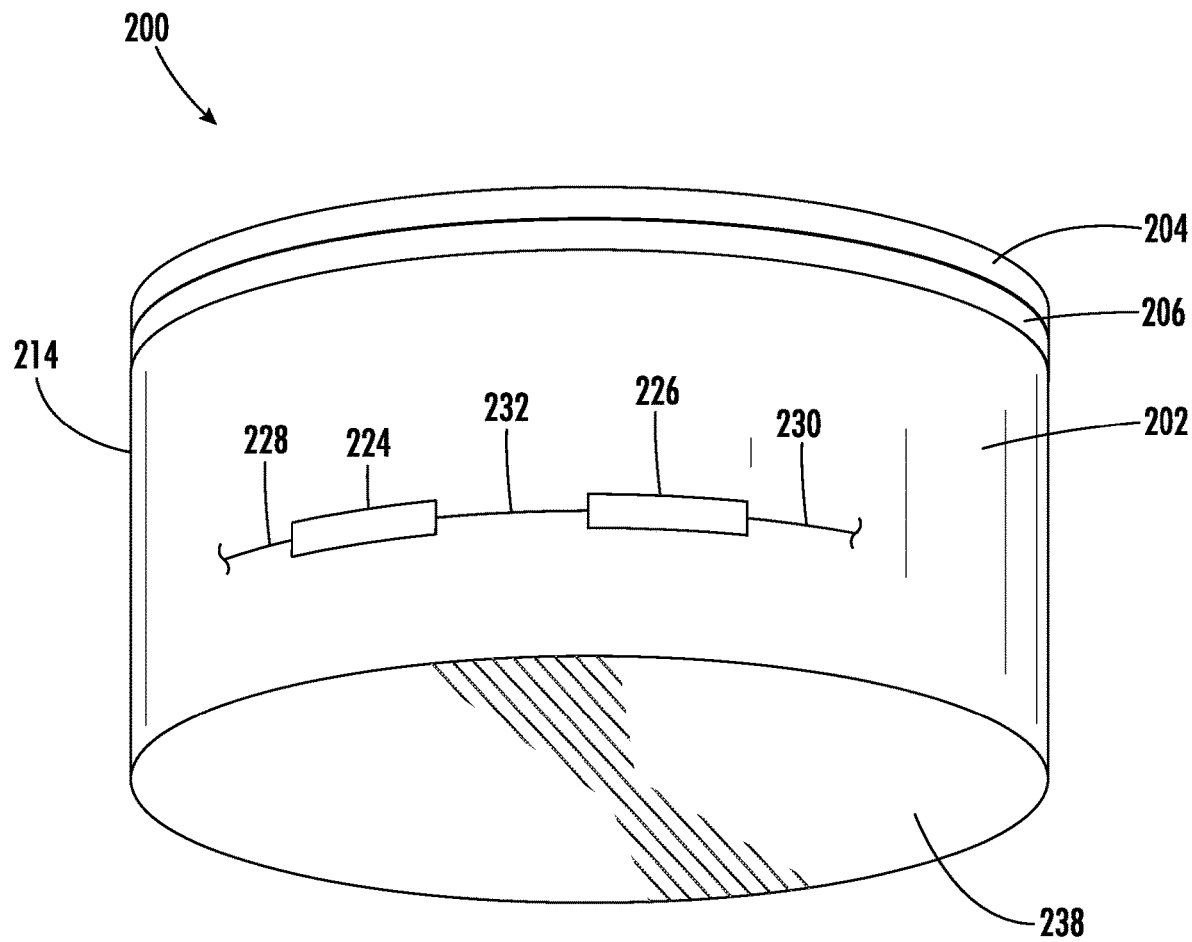
FIG. 5 is a bottom perspective view of the distillation chamber of FIG. 2 including exemplary heaters, according to aspects of the present disclosure.
Figure 6:
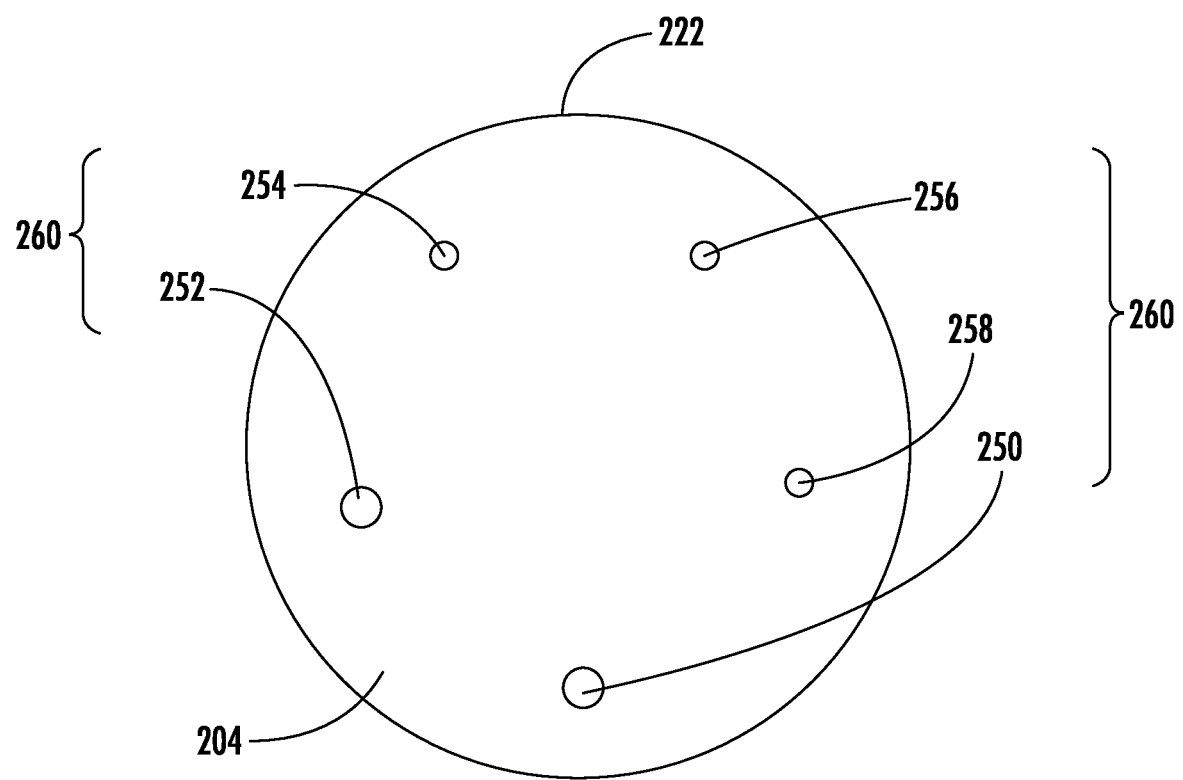
FIG. 6 is a top view of a distillation chamber cover, according to aspects of the present disclosure.

Referring again to FIG. 3, the first plate 204 and the ring 206 can be coupled to provide the cover 222 of the distillation chamber 200, as illustrated in FIGS. 5 and 6. The cover 222 can have several apertures 260, including but not limited to an intake hole 250, a vapor outlet hole 252, a float switch hole 254, a vapor probe hole 256, and an air pressure drain hole 258. Through the intake hole 250, the biomass 150 from the biomass storage container 152 can flow into the distillation chamber 200. The vapor outlet hole 252 can be used to pull the solvent 154, i.e., in a vapor form 174, out of the distillation chamber 200 and into the condenser 108. The float switch hole 254 can hold a float switch 292 located in the distillation chamber 200. The float switch 292 can be configures to engage and close the intake valve 140 when the biomass 150 reaches a predefined depth in the distillation chamber 200. The vapor probe hole 256 can be used to mount a vapor temperature sensor 530. And the air pressure drain hole 258 can receive a pressure relief valve 290 that can open if an internal pressure reaches a predetermined setpoint and direct the biomass to an overflow container (not shown) to relieve an accumulated pressure in the distillation chamber 200. The several apertures 260 on the cover 222 can be through holes and can be threaded to receive any mechanical components necessary to be coupled and sealed to the cover 222 to maintain the desired vacuum. With the first plate 204 and the ring 206 coupled to the distillation chamber body 202, the distillation chamber 200 can be sealed to hold the desired amount of vacuum. FIG. 6 shows an exemplary arrangement of the apertures 260 to avoid an interference with the drive assembly 400. However, other arrangements are possible.

Figure 7:
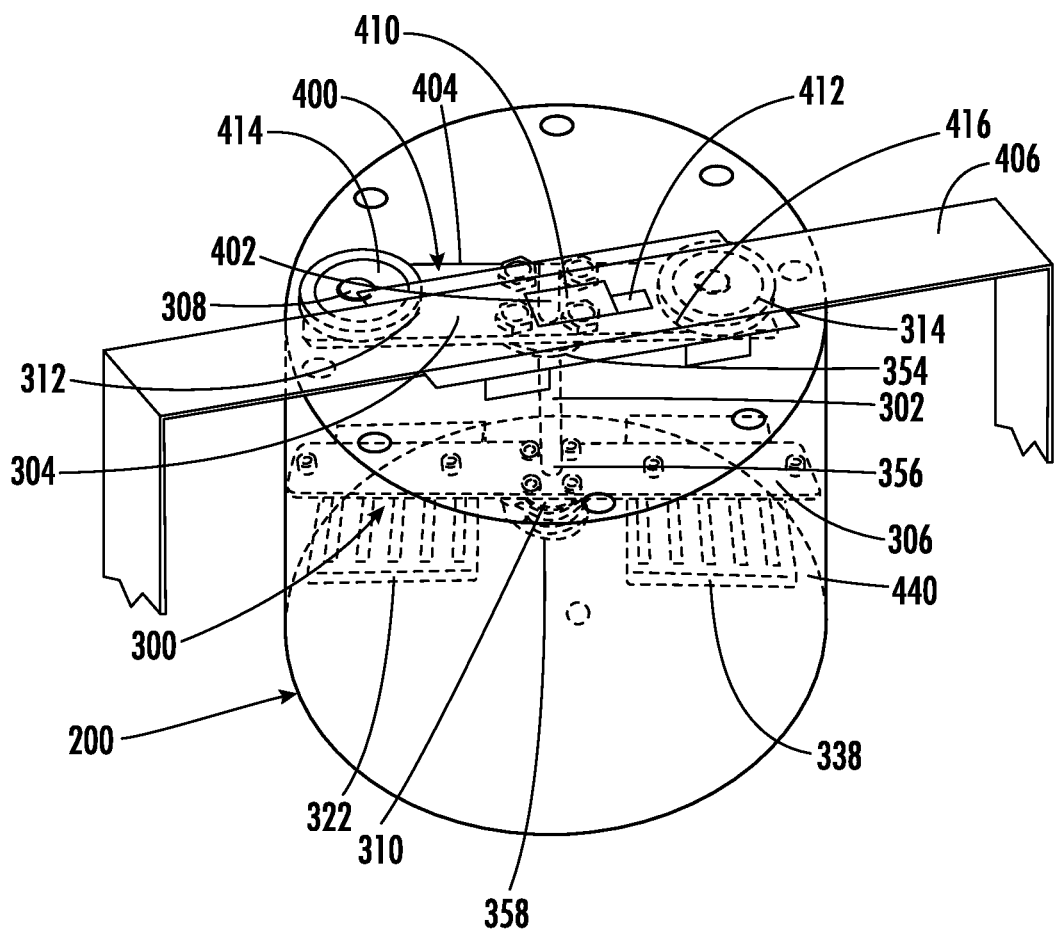
FIG. 7 is a front perspective view of an assembly of a magnetically driven arrangement and a distillation chamber, with an interior view of a spinner apparatus, according to aspects of the present disclosure.

Referring now to FIG. 7, the distillation chamber 200 can house the spinner apparatus 300 that can be controlled to spin, e.g., rotate, and agitate the biomass 150 within the distillation chamber 200 to aid in the distillation process 500. In some embodiments, the spinner apparatus can be a magnetically driven spinner apparatus, and as such, the spinner apparatus 300 can comprise a shaft 302, a driven magnet support bar 304 coupled to an upper portion 354 of the shaft 302, at least a first spinner magnet 312 and a second spinner magnet 314 coupled to the driven magnet support bar 304 with fasteners 308, a paddle support bar 306 coupled to a lower portion 356 of the shaft 302, and at least a first paddle 322 and a second paddle 338 coupled to the paddle support bar 306 with fasteners 308. In some embodiments, the spinner apparatus is the only moving part within the distillation chamber 200. In some embodiments, a bearing apparatus 310 can be positioned on the shaft 302 below the paddle support bar 306 and can be supported by a receiver 358 in the distillation chamber 200 to allow the shaft 302 of the spinner apparatus 300 to maintain its location in a center position of the distillation chamber and rotate, e.g., spin, within the distillation chamber 200. Fasteners 308 can include know fasteners such as nuts and bolts, screws, welds, and glues, as non-limiting examples. The spinner apparatus 300 can be positioned such that the first spinner magnet 312 and the second spinner magnet 314 do not contact the inside surface 262 of the cover 222 of the distillation chamber 200, when the cover is sealingly coupled to the distillation chamber body 202, creating a space 442 (shown in FIGS. 2 and 9). FIG. 7 further shows that there can be a space 440 between the paddles 322 and 338 and the inside surface 216 of the distillation chamber body 202, such that the paddles 322 and 338 avoid contact with the inside surface 216 of the distillation chamber body 202.

FIGS. 7-13 illustrate the spinner apparatus 300 with the first paddle 322 and the second paddle 338 in multiple views. The first paddle 322 can include a top surface 328, an inner side surface 332, an outer side surface 334, and a bottom surface 330. In some embodiments, a first ramped surface 324 can extend downward from the top surface 328, and a second ramped surface 326 opposite the first ramped surface 324 can extend downward from the top surface 328. In some embodiments, the top surface 328 can include one or more shape variations to direct and agitate the flow 320 of the biomass 150 across the top surface 328 and/or the bottom surface 330 of the first paddle 322. In some embodiments, the one or more shape variations can include one or more ribs 316 on the top surface 328. Gaps 318 can be positioned between the ribs 316 on the top surface 328. In some embodiments, the bottom surface 330 can include one or more cavities 336 within the bottom surface 330 (see FIGS. 12 and 13). Similarly, the second paddle 338 can include a top surface 344, an inner side surface 348, an outer side surface 350, and a bottom surface 346. In some embodiments, a first ramped surface 340 can extend downward from the top surface 344, and a second ramped surface 342 opposite the first ramped surface 340 can extend downward from the top surface 344. In some embodiments, the top surface 344 can include one or more ribs 316 on the top surface 344. Gaps 318 can be positioned between the ribs 316 on the top surface 344. In some embodiments, the bottom surface 346 can include one or more cavities 352 within the bottom surface 346 (see FIGS. 12 and 13).

Figure 8:
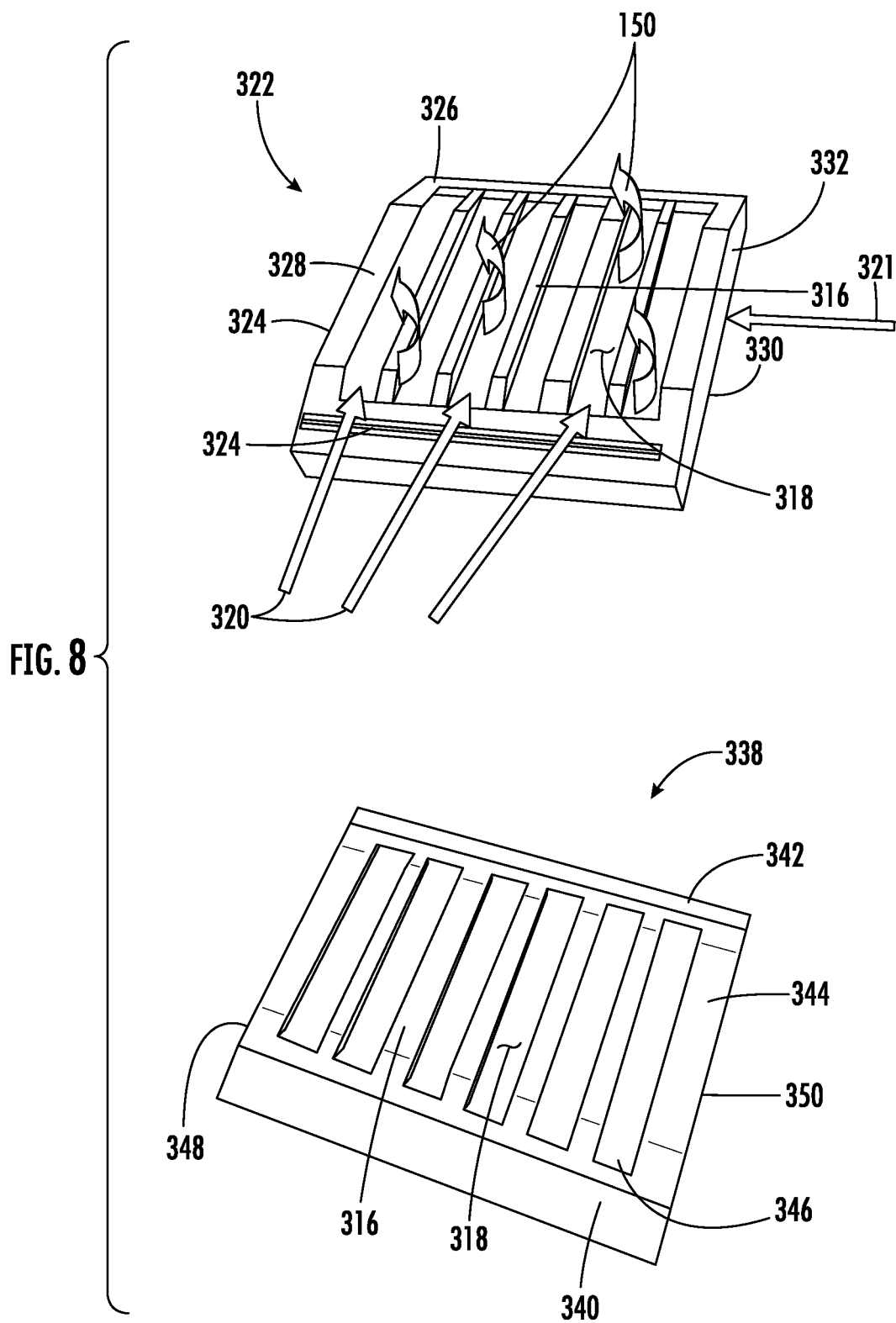
FIG. 8 is a front-left side perspective view of exemplary paddles, and an exemplary flow of a fluid through a paddle, according to aspects of the present disclosure.
Figure 9:
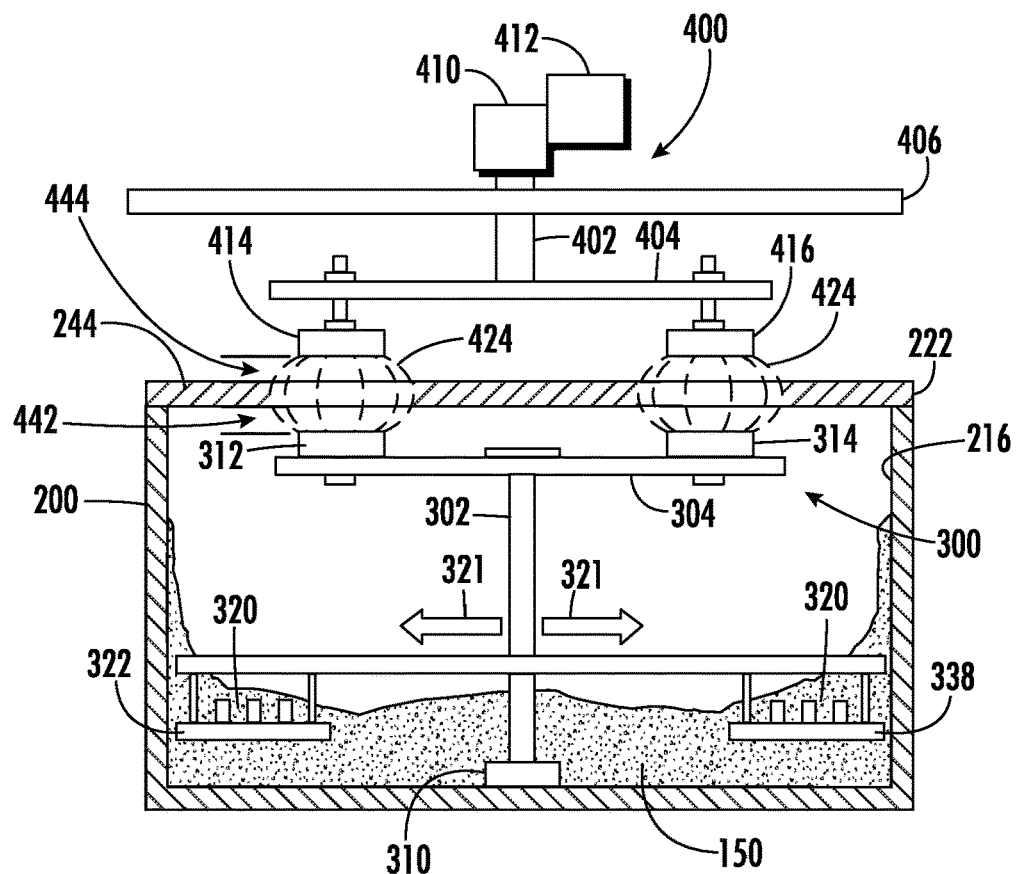
FIG. 9 is a front interior elevation view in section of a portion of the distillation system including the distillation chamber and the drive assembly, according to aspects of present disclosure.
Figure 10:
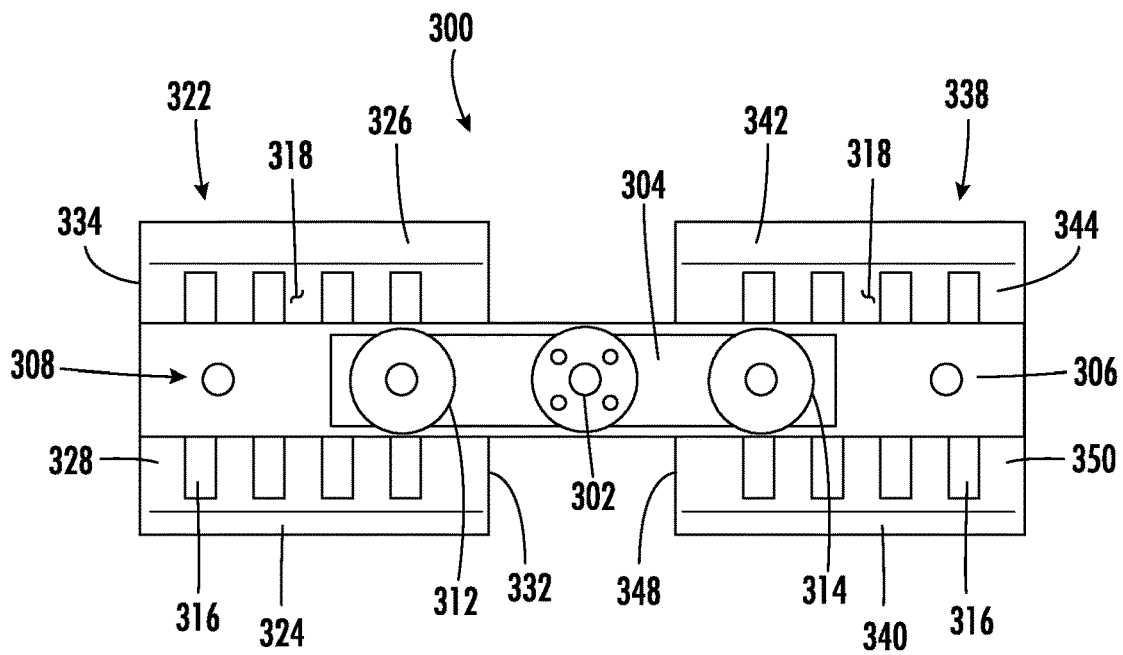
FIG. 10 is a top view of a spinner apparatus of FIG. 9, according to aspects of the present disclosure.
Figure 11:
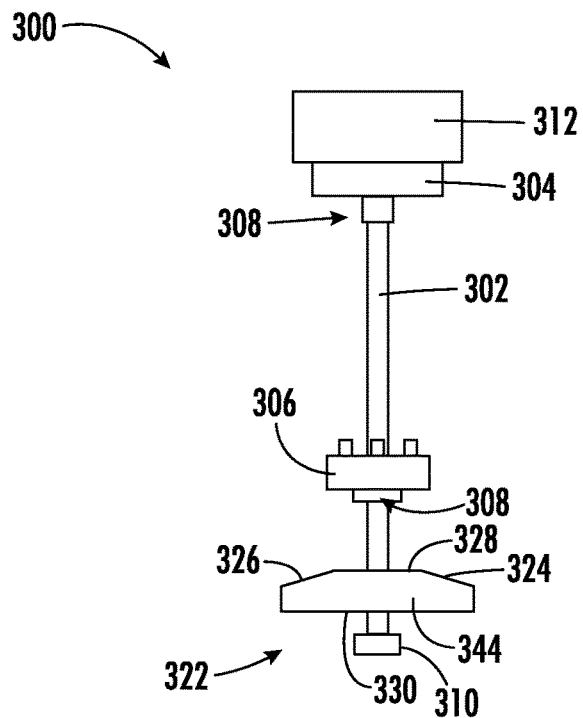
FIG. 11 is a side view of the spinner apparatus of FIG. 9, according to aspects of the present disclosure.
Figure 12:
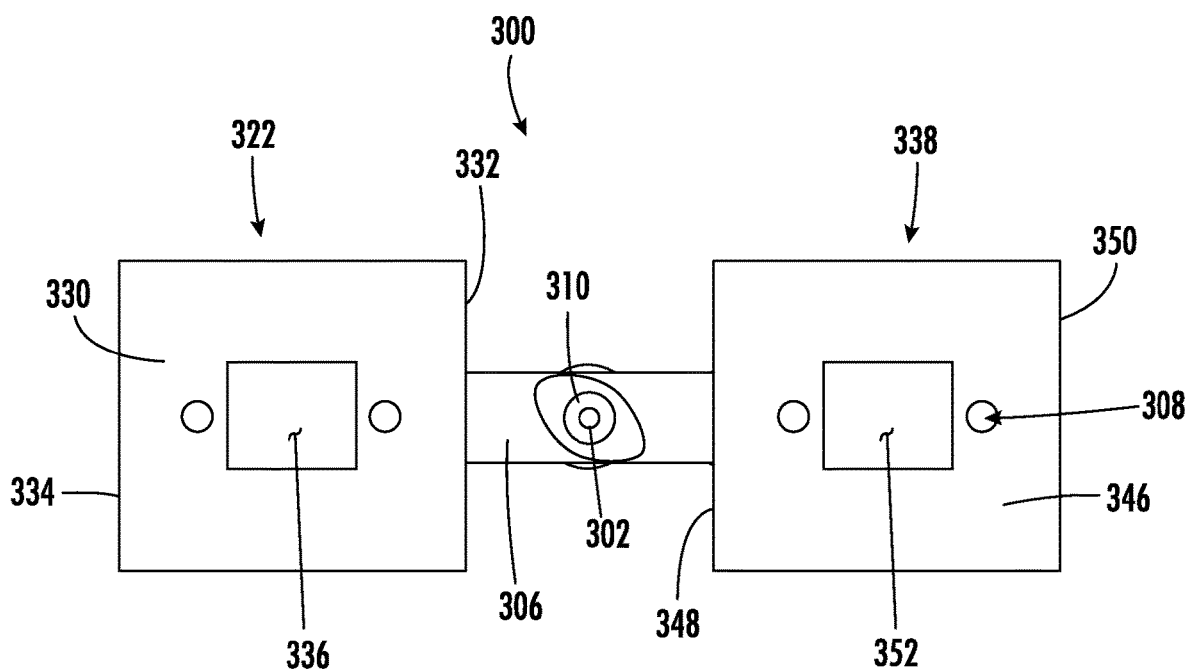
FIG. 12 is a bottom view of the spinner apparatus of FIG. 9, according to aspects of the present disclosure.
Figure 13:
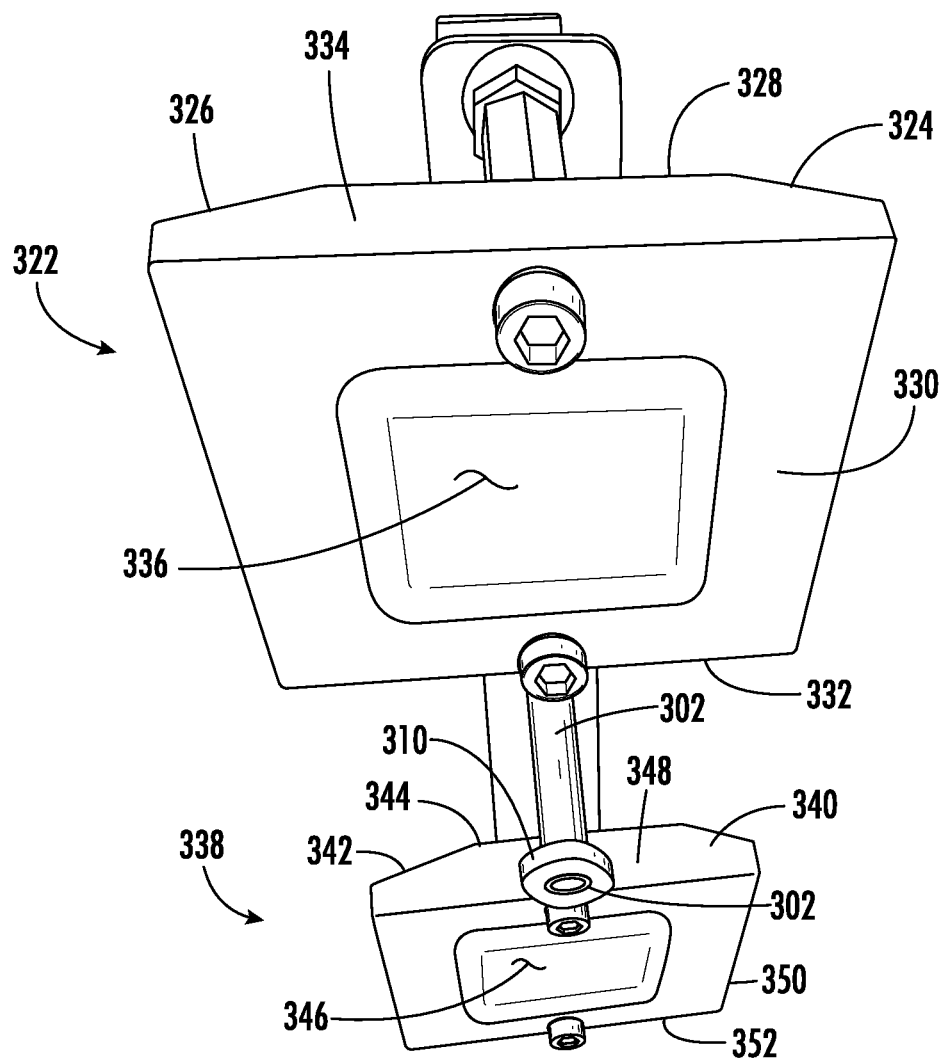
FIG. 13 is a bottom perspective view of the spinner apparatus of FIG. 9, according to aspects of the present disclosure.
Figure 14:
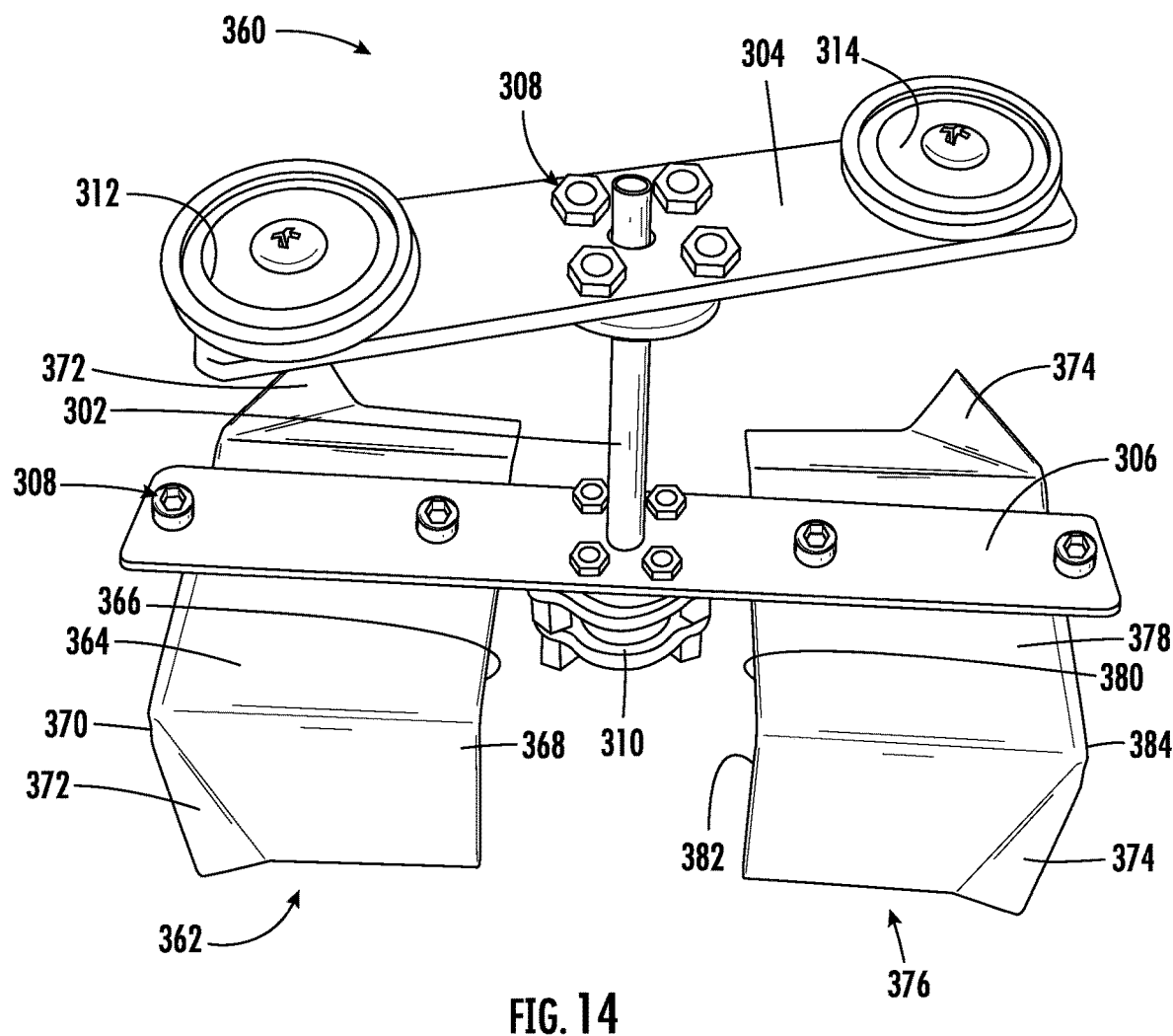
FIG. 14 is a front perspective view of an exemplary spinner apparatus, according to aspects of the present disclosure.
Figure 15:
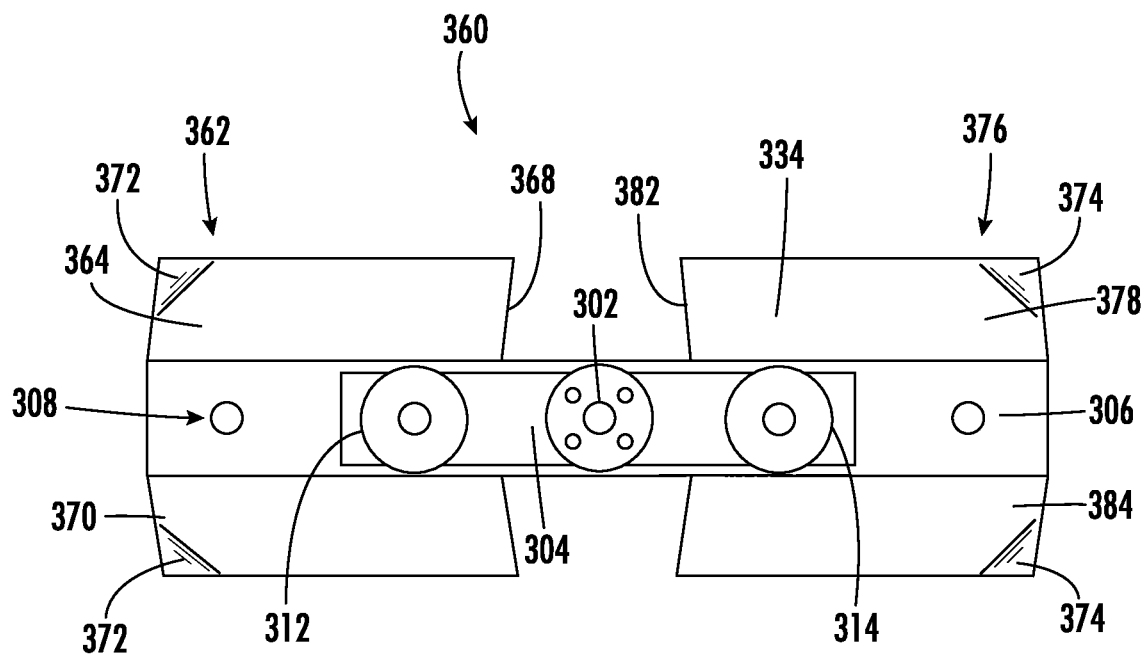
FIG. 15 is a top view of the spinner apparatus of FIG. 14, according to aspects of the present disclosure.
Figure 16:
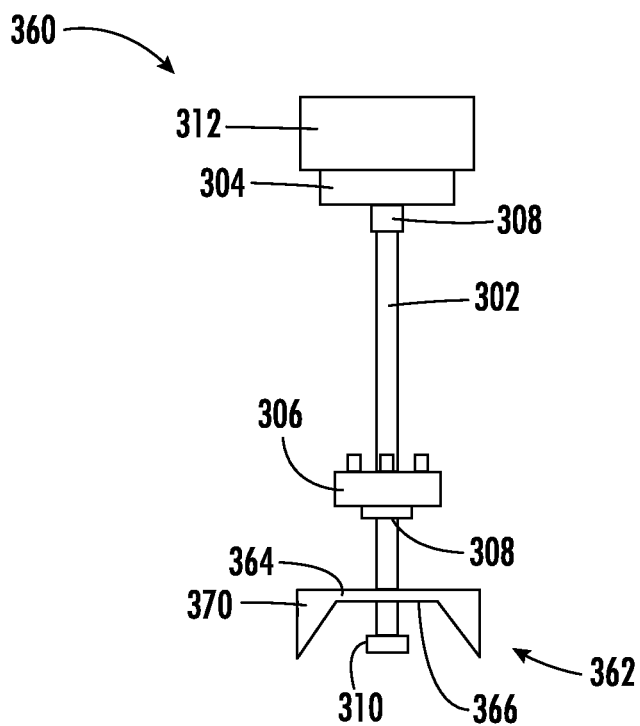
FIG. 16 is a side view of the spinner apparatus of FIG. 14, according to aspects of the present disclosure.
Figure 17:
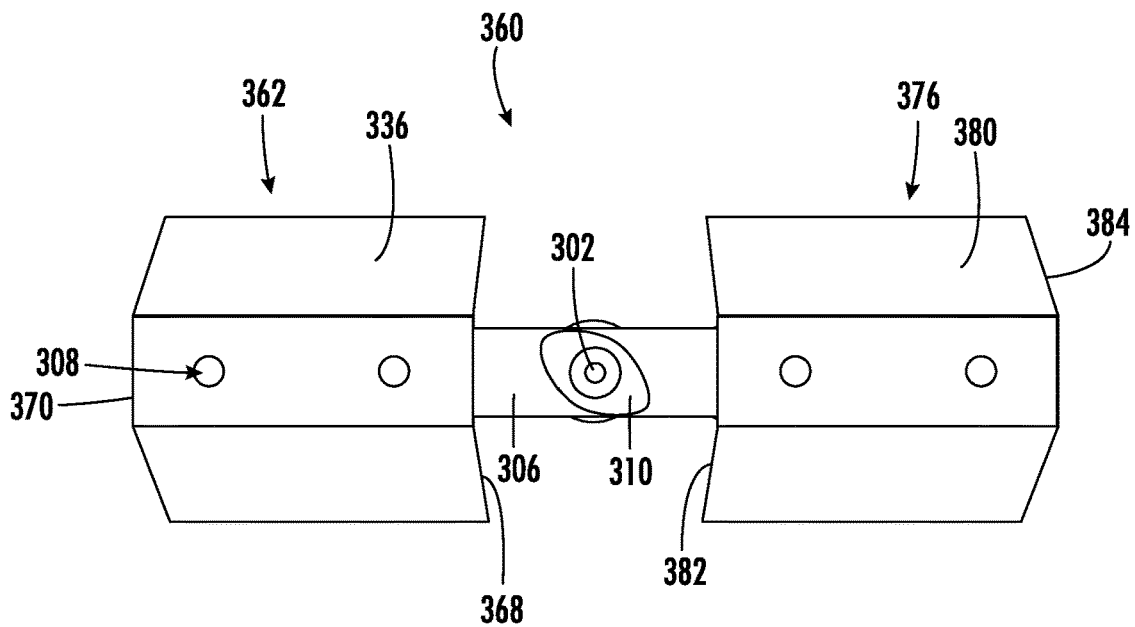
FIG. 17 is a bottom view of the spinner apparatus of FIG. 14, according to aspects of the present disclosure.

FIGS. 8 and 9 show an example of the biomass 150 flow 320 on and across the top surface 328 of the first paddle 322. Movement of the biomass 150 on and across the top surface 344 of the second paddle 338 can be the same. As the spinner apparatus 300 rotates inside the distillation chamber 200, the first paddle 322 and the second paddle 338 on the spinner apparatus 300 can move through the biomass 150 within the distillation chamber 200. The movement, which can include scooping the biomass 150 up and directing it across and through the ribs 316 of the first paddle 322 and the second paddle 338, generating flow 320, can create a first instance of a novel splash agitation process to produce either or both of a centrifugal force and an agitation to move the biomass 150 within the distillation chamber 200 for improved evaporation of the solvent 154. Rotation of the spinner apparatus 300 can create the centrifugal force 321 that pushes the biomass 150 from a center of the distillation chamber 200 outward, splashing and creating a second instance of the novel splash agitation process to produce a thin film of the biomass 150 against the inside surface 216 of the distillation chamber 200. The centrifugal force 321 can lift the biomass 150 over each of the ribs 316 and through each of the gaps 318, causing contact with additional surface areas, and which in some embodiments can be heated, in addition to the distillation chamber. The biomass 150 can be thinned as it spills and splashes through and over the ribs 316 and gaps 318 and reaches the inside surface 216 of the distillation chamber. For example, in some embodiments, the thickness of the biomass 150 can be in a range about 1/64 inch to 1/8 inch, although the thickness can vary based on specific applications. The overall spinning and agitation of the biomass 150 assists in the additional movement of the molecules of biomass 150, which can aid in the rapid boiling and evaporation of the solvent 154 more quickly and more thoroughly.

Thin film is a defined term typically used to describe using a flat surface to thin out the layer of chemical, making it easier to distil. The spinner apparatus 300 and at least the first paddle 322 and the second paddle 338 are not intended to scrape or contact the distillation chamber 200, but instead leave the space 440 between the paddles 322 and 338 and the inside surface 216 of the distillation chamber body 202, allowing the paddles 322 and 338 to create the novel splash agitation process and to bring the biomass 150 to the flat and curved surfaces of the paddles 322 and 338 and the inside surface 216 of the distillation chamber 200 while under the heat and the vacuum within the distillation chamber to speed up the distillation process 500. The spinner apparatus 300 can also agitate the biomass 150, further aiding in the distillation process 500. Boiling the biomass 150 without the spinner apparatus 300 can bring the heat to the biomass 150, causing some vaporization to occur. However, after some limited time, the distillate 158 component of the biomass 150 does not vaporize, and instead can accumulate on the bottom of the distillation chamber 200 as the distillate 158 is heavier than the solvent 154. Such accumulation can form a non-boiling barrier between the heat and the solvent 154, acting as insulation by blocking the heat from coming in contact with the solvent 154 in the biomass 150 and slowing the vaporization process. Using the spinner apparatus 300, the distillate 158 can be controllably scooped up and mixed so that a heat barrier is eliminated and that the heat from the distillation chamber 200 and/or the paddles 322, 338 is allowed to make contact with and vaporize the solvent 154. The spinning of the spinner apparatus 300 can be controlled to spin with forward, backward, and intermittent motion, and can be used to escalate the contact time between the biomass 150 and the paddle surfaces and the inside surface 216 of the distillation chamber 200.

Figure 24:
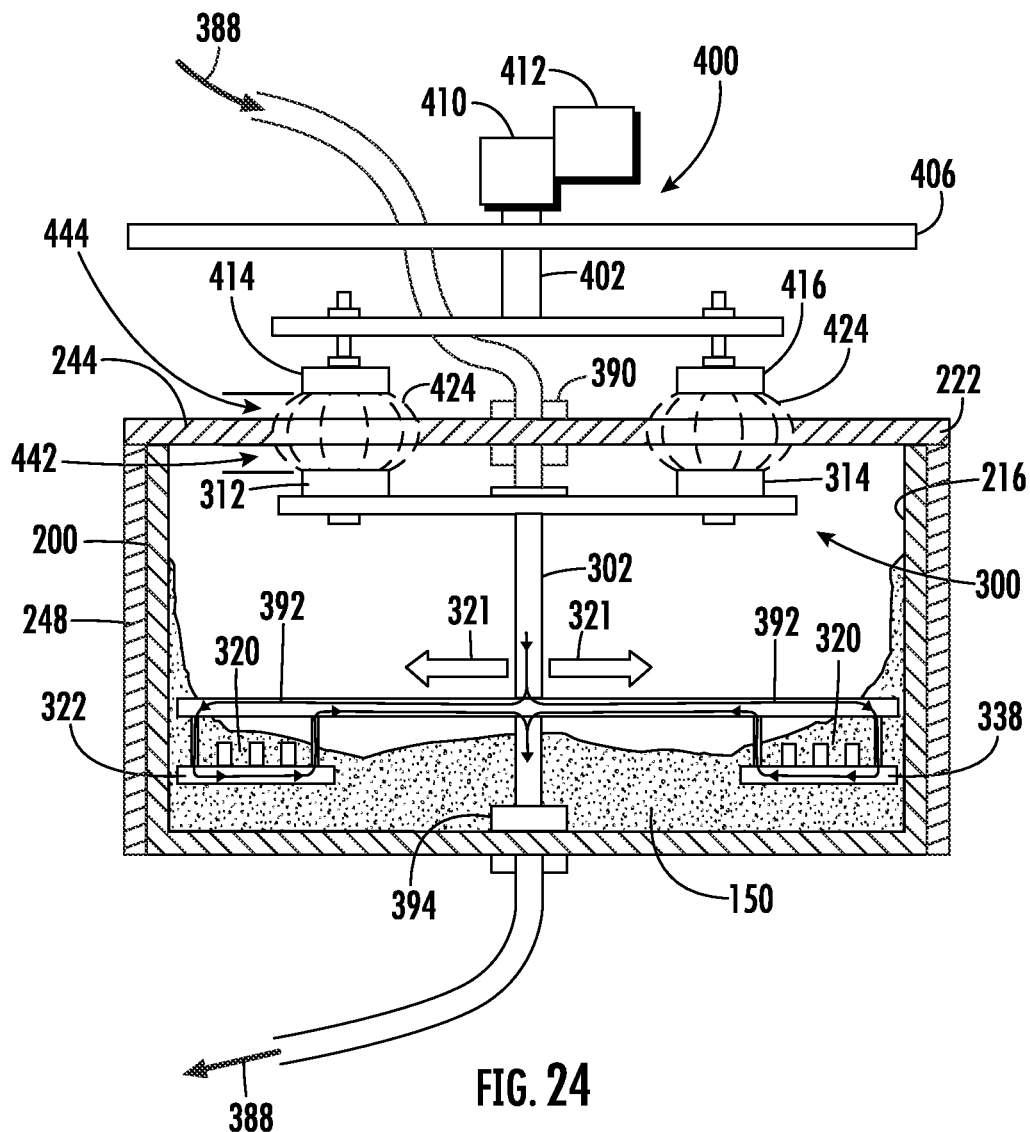
FIG. 24 is a front interior elevation view in section of a portion of the distillation system including the distillation chamber and the drive assembly, according to aspects of present disclosure, according to aspects of present disclosure.

In some embodiments, in addition to incorporating heaters 224, 226, or alternatively, one or more of the first paddle 322 and/or the second paddle 338 can be heated (see FIG. 24). A fluid, e.g., oil 388, can be heated and directed through a rotary joint 390 and through the shaft 302, and can flow through channels 392 formed in the paddles 322, 338, for example. The heated oil 388 can then exit the distillation chamber through the rotary joint 390, or a second rotary joint 394, and return to an oil heater (not shown). Additional heated surface areas can include portions of the entire inside surface 216 of the distillation chamber 200, in addition to any or all of the top, bottom, and sides of the distillation chamber 200. In some embodiments, an immersion heater (not shown) can be placed in the distillation chamber 200, alone or in combination with the other heat sources. In some embodiments, the distillation chamber 200 can include a jacketed wall 248 to heat the chamber, for example, such as an oil jacket 248 where the oil is heated and thus the inner chamber of the distillation chamber 200 is heated. Other fluids besides oil can be used. Any of the various forms of heating can be used to produce a controlled even heating of the distillation chamber 200. Subsequently, the heated biomass 150 is directed over and around the paddles 322 and 338 that can include any of textured and fluted blades beside ribbed blades for the purpose of creating the splash agitation that provides turbulence and reduces surface tension of the biomass 150.

In some embodiments, the biomass intake tube 270 can be wrapped around the outside surface 214 of the distillation chamber 200 to preheat the biomass 150 before the biomass 150 gets drawn into the distillation chamber 200. This can allow for the absorption of some of the heat that can be naturally lost from the distillation chamber 200, thereby improving the efficiency of the distillation system 100 by ultimately requiring less energy because some of the heat can be captured that may otherwise be lost.

FIGS. 14-17 illustrate spinner apparatus 360 according to embodiments of the present disclosure. The spinner apparatus 360 may be similar in design and functionality to the spinner apparatus 300 of FIGS. 7-13, with similar elements identified using like reference numerals, except as described herein or as apparent from the figures. For example, a first paddle 362 can include a top surface 364, an inner side surface 368, an outer side surface 370, and a bottom surface 366. In some embodiments, the first paddle 362 can include one or more generally angled blades 372 extending upward from the top surface 364, and/or extending downward from the bottom surface 366. Additionally, a second paddle 376 can include a top surface 378, an inner side surface 382, an outer side surface 384, and a bottom surface 380. The second paddle 376 can include one or more generally angled blades 374. The outer side surfaces 370, 384 can be formed to include the angled blades 372, 374 to move any biomass 150 or distillate 158 that may have thickened from the inside surface 216 and/or the bottom 220 of the distillation chamber 200. In some embodiments, the blades 372, 374 can be different sizes to create variations of the movement of the biomass 150 within the distillation chamber 200.

Figure 18:
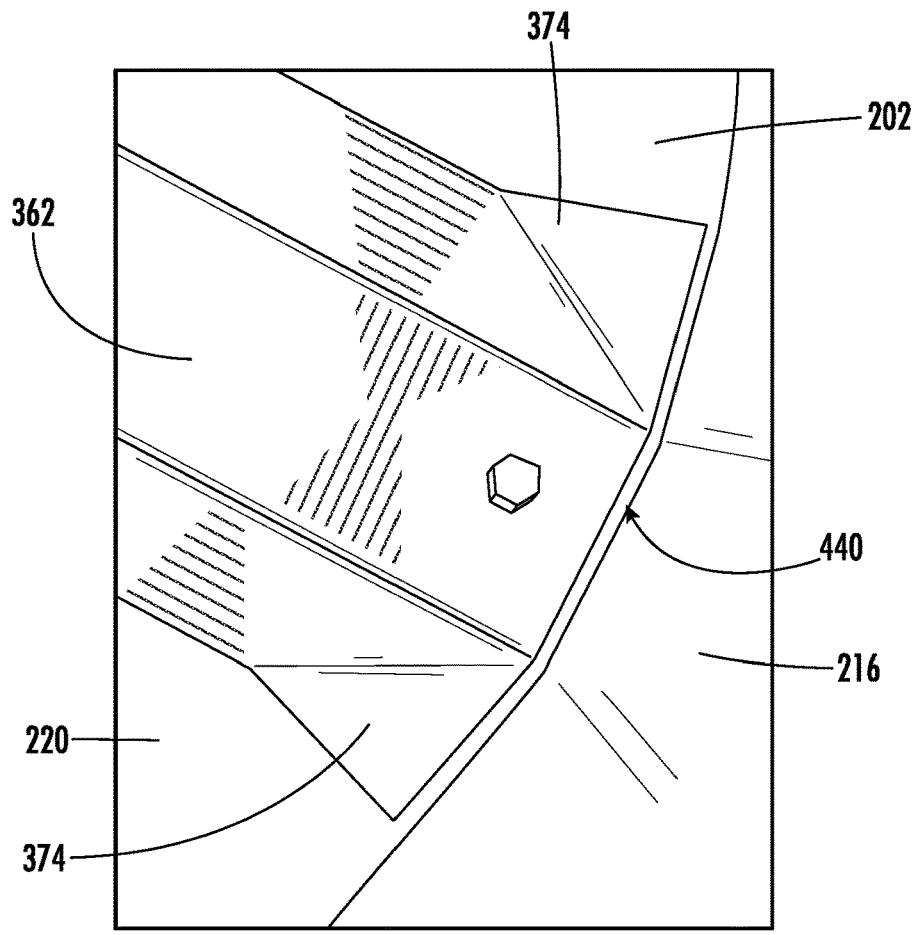
FIG. 18 a partial top view of the bottom and inside wall of the distillation chamber and a paddle of the spinner apparatus of FIG. 14, according to aspects of the present disclosure.

The spinner apparatus 300, 360 can include a plurality of paddles, and each paddle can include a variety of shapes and/or surface textures to create surface areas to agitate the biomass 150 and increase the surface area of the biomass 150. For example, a scoop, ramp, fins, waves, scallops, cups, flutes, etc., are all shapes or features that can be included on a paddle to be used for a variety of applications. A function of the spinner apparatus 300, 360, and the splash agitation process is to produce a greater surface area of what is to be distilled, and to also cause turbulence. FIG. 18 further shows that there can be a space 440 between the paddles 362 and 376 (and paddles 322 and 338) and the inside surface 216 of the distillation chamber body 202, such that the paddles 362 and 376 avoid contact with the inside surface 216 of the distillation chamber body 202.

Returning to FIGS. 7 and 9, the drive assembly 400 positioned outside the distillation chamber 200 can cause the spinner apparatus 300, 360 inside the distillation chamber 200 to spin. In some embodiments, the drive assembly 400 can cause the spinner apparatus 300, 360 inside the distillation chamber 200 to spin without the use of a drive shaft or drive mechanism passing through any wall of the distillation chamber 200. In some embodiments, the drive assembly 400 can include a shaft 402 coupled to the shaft 302. In some embodiments, the drive assembly 400 can be a magnetic drive assembly and can use external magnets to magnetically engage the spinner apparatus 300, 360 inside the distillation chamber 200 to cause the spinner apparatus 300, 360 to spin to produce the novel splash agitation distillation process In some embodiments, the magnetic drive assembly 400 can include a motor 412, a gear 410 coupled to the motor 412, the shaft 402 coupled to the gear 410, and a magnet support bar 404 coupled to a portion of the shaft 402. It is to be appreciated that for some configurations, the gear 410 and/or the shaft 402 are not required, and just the motor 412, and in some embodiments the motor 412 and the shaft 402, can be used. At least a first drive magnet 414 can be coupled to the magnet support bar 404, and at least a second drive magnet 416 can be coupled to the magnet support bar 404 using fasteners 408 to couple the first drive magnet 414 and the second drive magnet 416 to the magnet support bar 404. A bracket 406 can be positioned to support the drive assembly 400 in a fixed position. The fixed position of the drive assembly 400 can form a space 444 between at least the first and the second drive magnets 414, 416 and the cover 222 of the distillation chamber 200.

In some embodiments, the motor 412 can be controlled by the PLC 104 to drive the gear 410 and the shaft 402, thereby providing rotational movement to the coupled magnet support bar 404. The rotational movement can cause at least the first drive magnet 414 and the second drive magnet 416 to rotate generally horizontally, e.g., generally parallel, with the top surface 244 of the cover 222. With the spinner apparatus 300 inside the distillation chamber 200, a magnetic field 424 is generated between the first spinner magnet 312 and the first drive magnet 414, and between the second spinner magnet 314 and the second drive magnet 416, such that rotational movement of the first drive magnet 414 and the second drive magnet 416 can cause at least the first spinner magnet 312 and the second spinner magnet 314 to follow the movement of the magnetic field 424, causing the spinner apparatus 300 to spin within the distillation chamber 200 as the first drive magnet 414 and the second drive magnet 416 spin. The spinner apparatus 300 can be controlled by the PLC 104 to spin in a clockwise direction, and then reverse to spin in a counterclockwise direction, or to pulse in the same or opposite directions, or any other varied spinning motion. The drive assembly 400 and associated first drive magnet 414 and second drive magnet 416, and the spinner apparatus 300, 360, allow the spinner apparatus 300, 360 to spin with the distillation chamber 200 without any of the shafts 302, 402 extending through any surface of the distillation chamber 200, thereby reducing the possibility of vacuum leaks, and thereby improving the sealed reliability of the distillation chamber 200.

Figure 19:
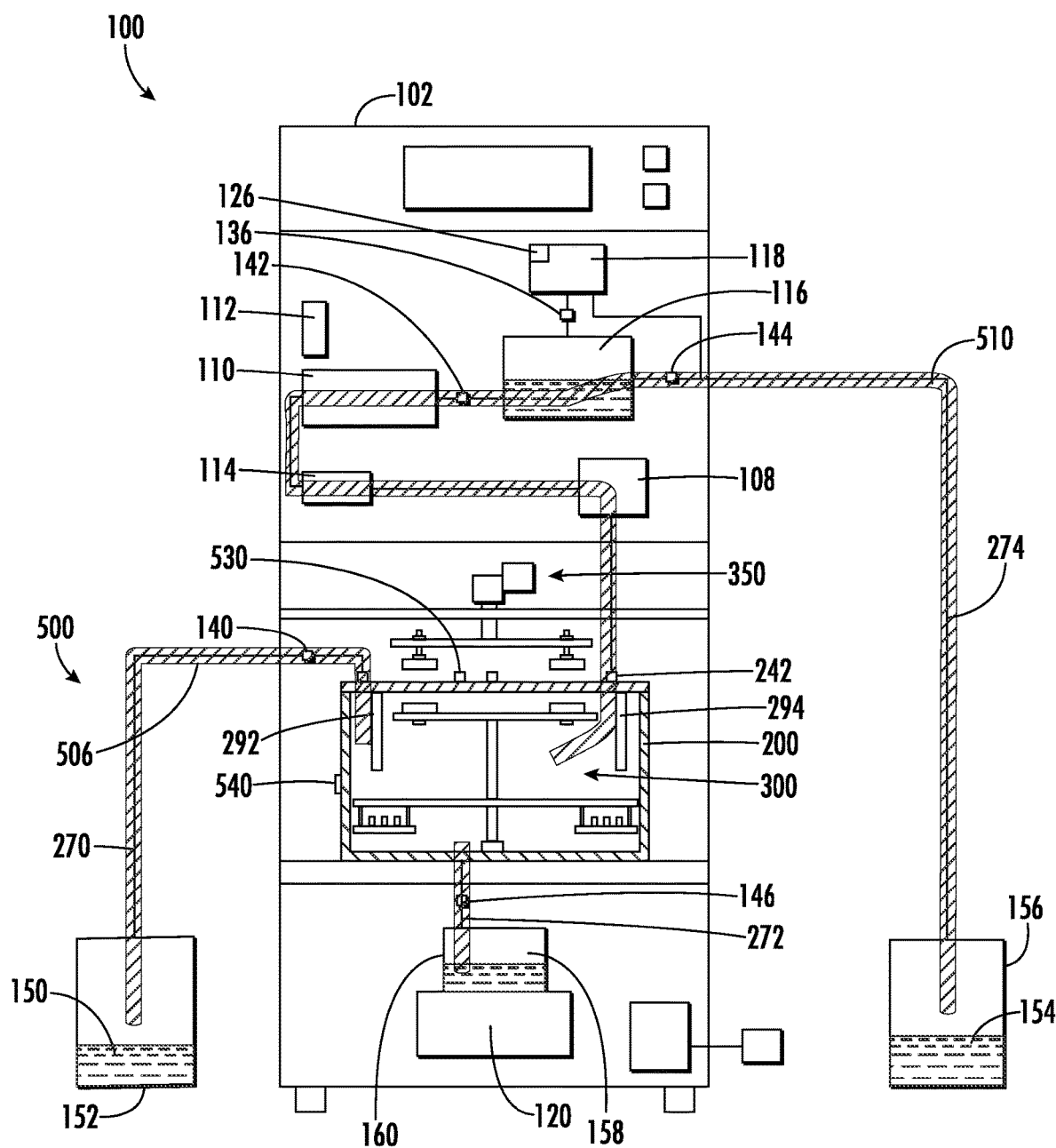
FIG. 19 is a schematic view of exemplary travel paths of a biomass through a distillation system, according to aspects of the present disclosure.
Figure 20:
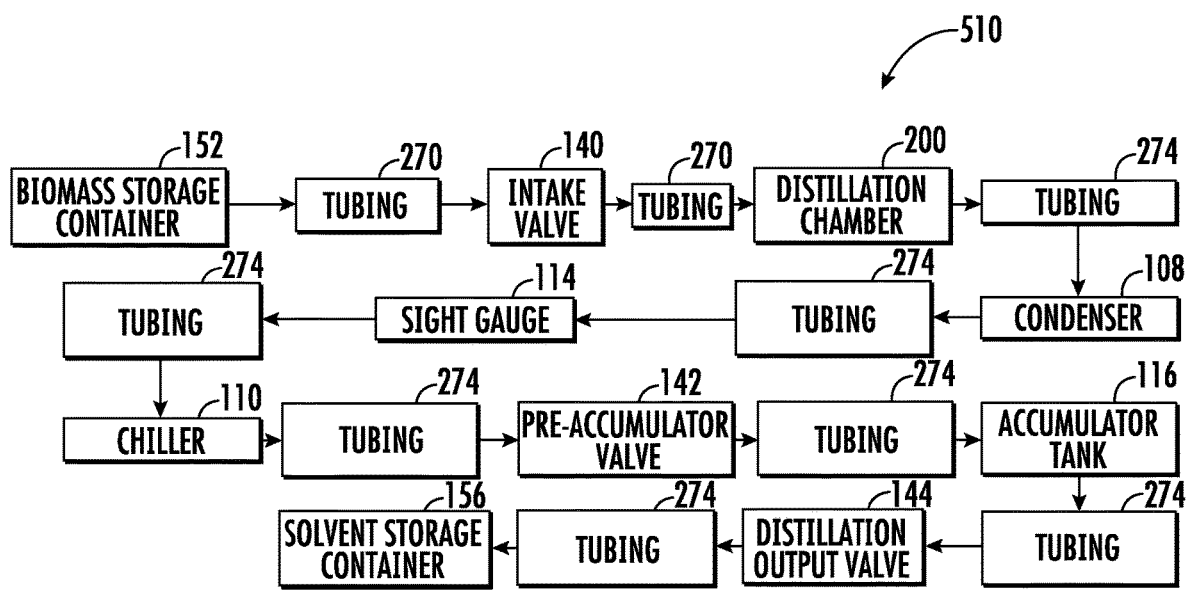
FIG. 20 is a flowchart of components a biomass and a solvent from the biomass travel through in a distillation system, according to aspects of the present disclosure.
Figure 21:
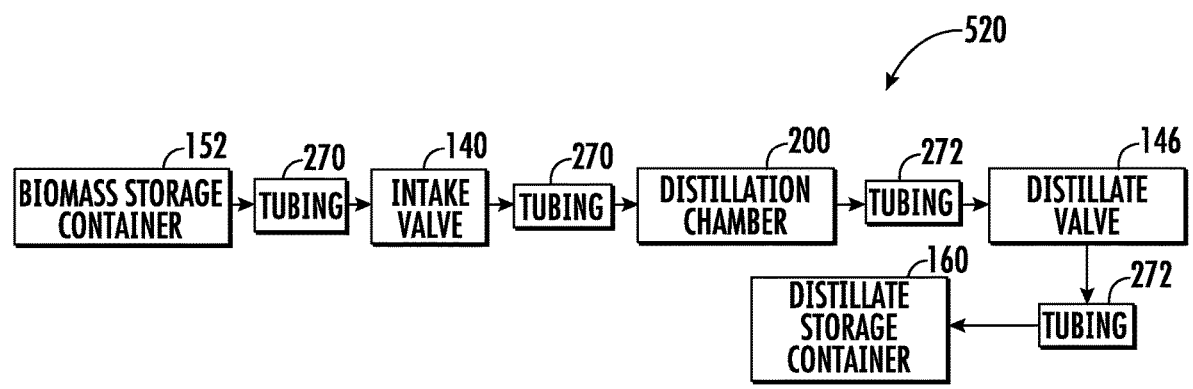
FIG. 21 is a flowchart of components a biomass and a distillate from the biomass travel through in a distillation system, according to aspects of the present disclosure.

FIGS. 19-21 illustrate embodiments of the distillation process 500 for distilling the biomass 150 with the distillation system 100 described above. As illustrated in the schematic view of FIG. 19, flow paths of the biomass 150 are shown, including a biomass flow path 506 of the biomass 150, a solvent flow path 510 of the solvent 154, along with a distillate flow path 520 of the distillate 158. FIG. 20 shows a flow chart of the solvent flow path 510 of the distillation process 500 that the solvent 154 can take, and FIG. 21 shows a flow chart of the distillate flow path 520 of the distillation process 500 that the distillate 158 can take.

Prior to the start of the solvent flow path 510 in FIGS. 19 and 20, when the distillation system 100 is turned on, the vacuum pump 118 can be powered on to create a vacuum pressure in the accumulator tank 116 at a low temperature, and thus draw a vacuum through the condenser 108, the chiller 110, and the distillation chamber 200. With this low temperature distillation process utilizing vacuum from the vacuum pump 118, the solvent 154 can be extracted from the biomass 150 leaving behind the desired distillate 158. In some embodiments, the low temperature can be in the range of about 70 degrees Celsius to about 90 degrees Celsius, or more particularly about 80 degrees Celsius. A higher temperature distillation process can be in the range of about 110 degrees Celsius to about 130 degrees Celsius, or more particularly about 120 degrees Celsius. In some embodiments, heated air can be introduced into the vacuum line to provide heat within the distillation chamber 200.

As an exemplary description of the distillation process, as the biomass 150 heats up, evaporation of the solvent 154 can start to occur, and the solvent vapor 174 temperature can be monitored via a vapor temperature sensor 530, for example. Monitoring the solvent vapor temperature provides a direct indication of the distillation process occurring. The solvent vapor temperature can change rapidly as the solvent 154 is distilling. The solvent vapor temperature can then drop as less solvent 154 remains in the distillation chamber 200. After a substantial portion of the solvent 154 has been removed from the biomass 150, leaving primarily the distillate 158 in the distillation chamber 200, the temperature change of the distillate 158 can stabilize as primarily only the distillate 158 remains in the distillation chamber. The vapor temperature sensor 530 can also sense a temperature drop in the solvent vapor 174 as there is very little solvent 154 remaining to distill out. In some embodiments, the distillation process can be a timed process, e.g., the PLC 104 can be programmed to operate the distillation system 100 for a predetermined amount of time. In other embodiments, the PLC 104 can be programmed to operate the distillation system until the vapor temperature sensor 530, and/or other PLC inputs, indicates that the distillation process has been completed.

In some embodiments, when the distillation process 500 is initiated, e.g., via the touchscreen display 124 or the control switches 106, the intake valve 140 can open and can allow a liquid, e.g., the biomass 150 in the biomass storage container 152, to be drawn into the distillation chamber 200 through the biomass intake tube 270. For some applications, once the vacuum reaches approximately 12 inches of Hg, although more or less pressure can be applied, the heaters 224, 226, for example, can be turned on. The biomass 150 under vacuum can then be heated to its boiling point. If vacuum does not reach, or falls under, a certain set point, a vacuum regulator switch 126, included in some embodiments, can generate a signal to shut off or turn down the strip heaters 224, 226, to prevent an empty or not filled distillation chamber 200 from overheating.

When the biomass 150 reaches a predetermined height within the distillation chamber 200, the float switch 292 in the distillation chamber 200 can be actuated and can provide a signal to the PLC 104 to close the intake valve 140. As the solvent 154 typically has a lower boiling point than the distillate 158, the solvent 154 can boil to a vapor form inside the distillation chamber 200, leaving the distillate 158 behind. At a predetermined time, the pre-accumulator valve 142 can be controlled by the PLC to open, thereby allowing the vacuum to pull the solvent 154 in a vapor form out of the distillation chamber 200 and into the condenser 108 where it can be cooled and turned back into its liquid form. The solvent 154 in a liquid form can be further cooled as it passes through the chiller 110 and the pre-accumulator valve 142 into the accumulator tank 116. The sight gauge 114, which in some embodiments can be positioned between the chiller 110 and the accumulator tank 116, can be used to visually check the flow of the solvent 154 in a liquid form. When a predetermined or desired amount of the solvent 154 is boiled off, the distillation output valve 144 can be controlled by the PLC 104 to open, as the pre-accumulator valve 142 closes, and a small amount of compressed air can be pushed into the accumulator tank 116, forcing the solvent 154 out of the accumulator tank 116 and into the solvent storage container 156 through a solvent discharge tube 274. The solvent 154 can then be reused for a desired purpose.

In some embodiments, a small amount of solvent 154 can be pulled into the vacuum pump 118. To aid in removing the small amount of solvent 154, a drain tube 164 can be coupled to the vacuum pump 118 to direct the solvent 154 away from the vacuum pump 118.

Referring to FIGS. 19 and 21, the distillate flow path 520 may begin with the biomass 150 within the biomass storage container 152 entering the distillation chamber 200 through the biomass intake tube 270 and the intake valve 140. The distillate 158 from the biomass 150 can remain in the distillation chamber 200 when the solvent 154 boils to a vapor form and is removed. The distillate valve 146 can be controlled by the PLC 104 to open, and compressed air from the vacuum pump 118 can be used to push the remaining distillate 158 out of the distillation chamber 200 and into the distillate storage container 160. The distillate storage container can be positioned on the heating mantle 120 to maintain a desired temperature and consistency of the distillate 158. The produced distillate 158 can be a desired distillate extract. In some embodiments, compressed air may not be required to push the remaining distillate 158 out of the distillation chamber 200.

The distillation system 100 can remove not only the solvent 154 included in the distillation process 500 but any other unwanted contaminants that may be in the biomass 150. Typical distillation systems distill a solution, and the good or wanted product, for example ethanol, is what gets distilled for subsequent reuse. The by-product is not the desired end result; the material that is left behind is generally considered waste. In some embodiments, the distillation system 100 distills off what is not wanted, e.g., the solvent 154, and the remaining material can be the desired end result, e.g., the distillate 158. The distillate 158 can be in its purest form, devoid of not only the solvent 154, but many impurities that my compromise the integrity of the distillate 158.

With continued reference to FIG. 19, when the distillate 158 in the distillation chamber 200 is removed, the distillation process 500 can automatically repeat the steps in FIGS. 20-21, with additional biomass 150 either automatically or by user intervention entering the distillation chamber 200. In some embodiments, the distillation system 100 can be configured to operate as a continuous cycle. A continuous cycle is not a batch process. As the solvent 154 is distilled from the distillation chamber 200, additional biomass 150 can be brought into the distillation chamber 200. When the distillation chamber 200 has reached a desired capacity of only the distillate 158, the distillate 158 can be automatically moved to the waiting distillate storage container 160. The distillate storage container 160 can be sealed and/or heated, keeping the distillate 158 in a desires state, e.g., flowable until removal is required. The distillation system 100 can then provide an indication to the user that the distillate storage container 160 is ready to be removed and replaced with an empty container. Once the distillate 158 has been placed into the distillate storage container 160, the distillation system 100 can continue the process by drawing additional biomass 150 into the distillation chamber 200 as needed. Thus, the distillation system 100 can be configured to continuously produce distillate 158, other than when the distillate 158 is being removed from the distillation chamber 200.

As non-limiting examples, the biomass intake tube 270 can be a 12-foot section of ½ inch outer diameter polyurethane tubing. The distillate drain tubing 272 can be a 10-foot section of ⅜ inch o.d. high temperature, blue Teflon hose. The solvent discharge tubing 274 can be a 10-foot section of ½ inch outer diameter polyurethane tubing.

In some embodiments, and for particular applications, during the distillation process 500, intermittent spinning of the spinner apparatus 300, 360 and associated paddles 322, 338, 362, 376 can increase the amount of solvent 154 distilled out of the distillate 158. In other words, the spinner apparatus 300, 360 can be controlled by the PLC to spin for a certain number of seconds or minutes and then rest for a period of time. In some embodiments, the ratio of spinning to resting can be a determinant factor in the amount of solvent 154 distilled out of the distillate 158. In some embodiments, the amount of heat applied to the distillation chamber can also be a determinant factor in the amount of solvent 154 distilled out of the distillate 158. Further, some embodiments of the distillation system 100 can reduce the number of steps required to produce the final distillate 158 and/or replace the single cycle distillation process with the novel splash agitation process integrated into a continuous cycle process.

In some embodiments, a second float switch 294 can be located in the distillation chamber 200. If the float switch 292 fails and the distillation chamber 200 begins to overfill, the second float switch 294 can generate a signal to shut down or alter the distillation system 100. In other embodiments, an accumulator float switch 296 in the accumulator tank 116 can be included and configured to generate a signal to automatically drain the accumulator tank 116 and start the next cycle. In some embodiments, the distillation chamber 200 can be at normal atmospheric pressure.

The type of fluids that the distillation system 100 can distill is endless. Solvents, alcohols, oils, water, or any solution that can be split can use the distillation process 500. The distillation system 100 can also do multiple settings to distill different fluids from the same solution by setting different temperatures and/or run times and/or spinner spin rates and/or vacuum levels.

Figure 22:
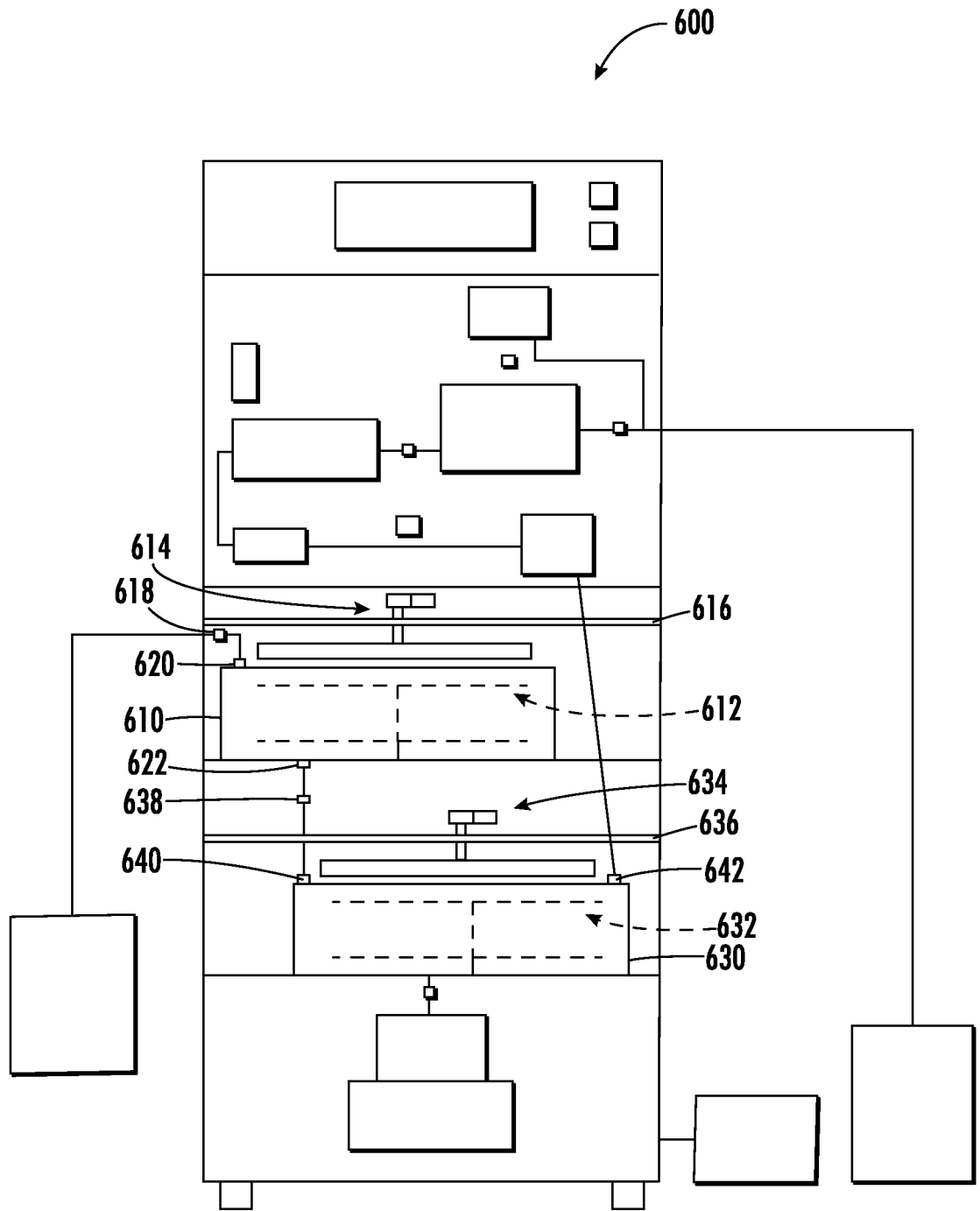
FIG. 22 is a front interior elevation view of an alternative distillation system, according to aspects of the present disclosure.

In some embodiments, the distillation system can have two or more distillation chambers. FIG. 22 illustrates a distillation system 600 according to some embodiments of the present disclosure. The distillation system 600 can be similar in design and functionality to the distillation system 100, with similar elements identified using like reference numerals, except as described herein or as apparent from the figures. The distillation system 600 can comprise a first distillation chamber 610 and a second distillation chamber 630. The first distillation chamber 610 can be in fluid communication with the biomass storage container 152, from which the biomass 150 can flow through an inlet 620 of the first distillation chamber 610 as an intake valve 618 can be controlled by the PLC 104 to open. A bracket 616 can be positioned above the first distillation chamber 610 to support and maintain the position of a drive assembly 614. A spinner apparatus 612 can be positioned in the first distillation chamber 610. The drive assembly 614 can be controlled by the PLC 104 to control the movement of the spinner apparatus 612 in the same or similar way as the drive assembly 400, moving the biomass 150 within the first distillation chamber 610.

Once a distillation cycle completes, the first distilled distillate can exit through an outlet 622, and an intake valve 638 can be controlled by the PLC 104 to allow the first distilled distillate fluid to enter the second distillation chamber 630 through a second inlet 640. A bracket 636 can be positioned above the second distillation chamber 630 to support and maintain the position of a second drive assembly 634. A second spinner apparatus 632 can be positioned in the second distillation chamber 630. The second drive assembly 634 can be controlled by the PLC 104 to control the movement of the second spinner apparatus 632, moving the first distilled distillate within the second distillation chamber 630. Within the first and/or second distillation chambers 610, 630, the solvent 154 from the first distilled distillate can be in a gas form and can be removed from the second distillation chamber 630 with vacuum, and can flow into the condenser 108, exiting the second distillation chamber 630 through an outlet 642. The distillate 158 from the biomass 150 can flow into the distillate storage container 160 when the distillate valve 146 is controlled by the PLC 104 to open.

In some embodiments, the first distillation chamber 610 and the second distillation chamber 630 can have a combined larger volume and associated surface area than the volume and surface area of the distillation chamber 200. In some embodiments, there can be variations of the shape of paddles on the spinner apparatuses 612, 632. Settings and processes related to each of the first distillation chamber 610 and the second distillation chamber 630 can be controlled differently, including all aspects of applying heat, vacuum, agitation, and spinner apparatus speed, as non-limiting examples.

Figure 23:
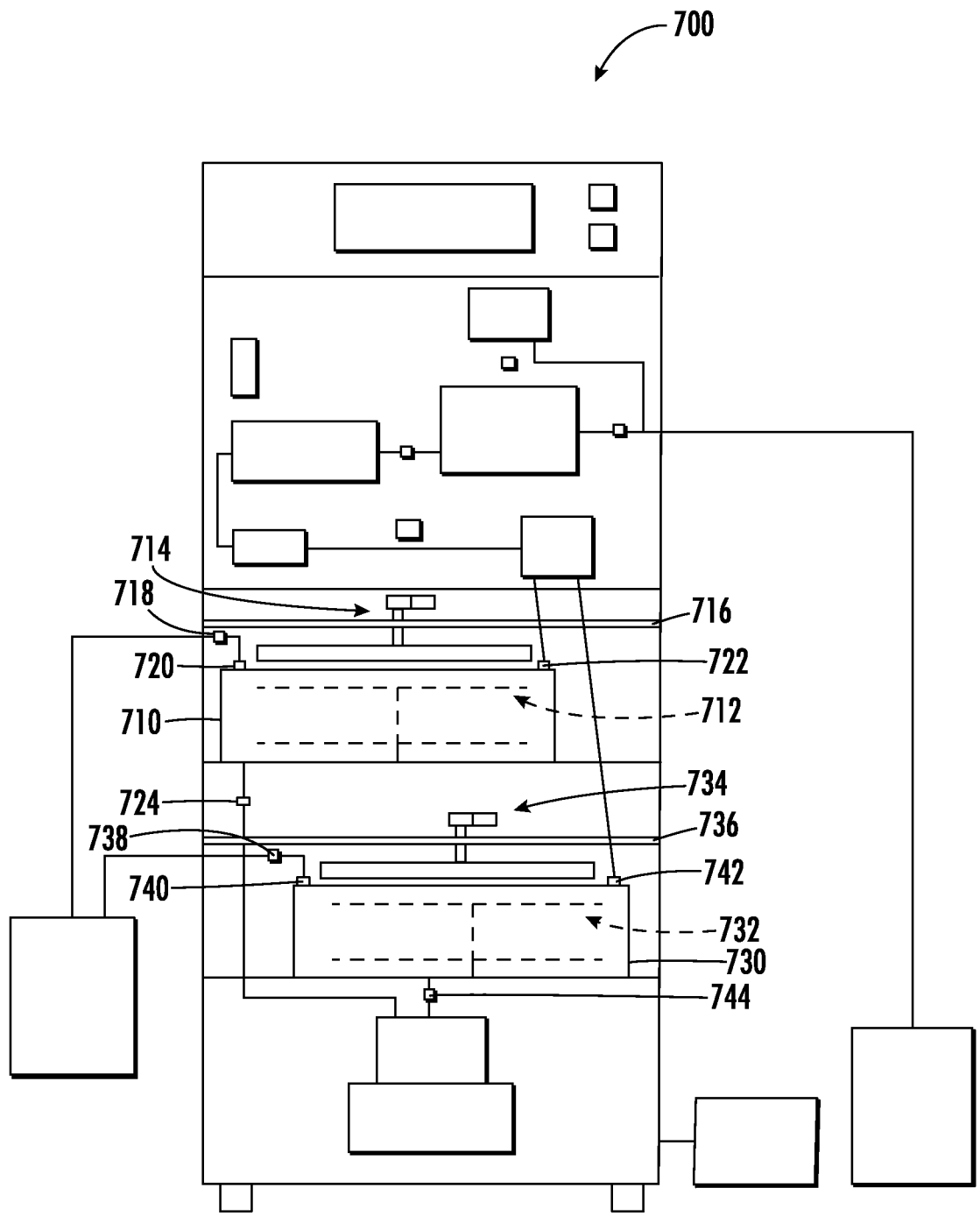
FIG. 23 is a front interior elevation view of an alternative distillation system, according to aspects of present disclosure.

According to another embodiment of the present disclosure, FIG. 23 illustrates a distillation system 700, which can be similar in design and functionality to the distillation system 100 and 600, with similar elements identified using like reference numerals, except as described herein or as apparent from the figures. The distillation system 700 can comprise a first distillation chamber 710 and a second distillation chamber 730. The first distillation chamber 710 can be in fluid communication with the biomass storage container 152, from which the biomass 150 can flow through an inlet 720 of the first distillation chamber 710 as an intake valve 718 can be controlled by the PLC 104 to opens. A bracket 716 can be positioned above the first distillation chamber 710 to support and maintain the position of a drive assembly 714. A spinner apparatus 712 can be positioned in the first distillation chamber 710. The drive assembly 714 can be controlled by the PLC 104 to control the movement of the spinner apparatus 712 in the same or similar way as the drive assembly 400, moving the biomass 150 within the first distillation chamber 710. Within the first distillation chamber 710, the solvent 154 from the biomass 150 can be in a gas form and can be removed from the first distillation chamber 710 with vacuum, and can flow into the condenser 108, exiting the first distillation chamber 710 through an outlet 722. The distillate 158 from the biomass 150 can flow into the distillate storage container 160 as a distillate valve 724 can be controlled by the PLC 104 to open.

Similarly, the second distillation chamber 730 can be in fluid communication with the biomass storage container 152, from which the biomass 150 can flow through an inlet 740 of the second distillation chamber 730 as an intake valve 738 can be controlled by the PLC 104 to open. A bracket 736 can be positioned above the second distillation chamber 730 to support and maintain the position of a drive assembly 734. A spinner apparatus 732 can be positioned in the second distillation chamber 730. The drive assembly 734 can be controlled by the PLC 104 to control the movement of the spinner apparatus 732 in the same or similar way as the drive assembly 400, moving the biomass 150 within the second distillation chamber 730. Within the second distillation chamber, the solvent 154 from the biomass 150 can be in a gas form and can be removed from the second distillation chamber 730 with vacuum, and can flow into the condenser 108, exiting the second distillation chamber 730 through an outlet 742 of the second distillation chamber 730. The distillate 158 from the biomass 150 can flow into the distillate storage container 160 as a product valve 744 can be controlled by the PLC 104 to open.

In some embodiments, the first distillation chamber 710 and the second distillation chamber 730 can have a combined larger volume and associated surface area than the volume and surface area of the distillation chamber 200. In some embodiments, there can be variations of the shape of paddles on the spinner apparatuses 712, 732. Settings and processes related to each of the first distillation chamber 710 and the second distillation chamber 730 can be controlled differently, including all aspects of applying heat, vacuum, agitation, and spinner apparatus speed, as non-limiting examples.

In some embodiments, a distillation system can be a single unit designed to eliminate the need for a "second step" in the extraction of solvent from a biomass. The distillation system can eliminate the second step by utilizing vacuum, when required, and an internal chiller system to extract as much solvent as possible, leaving behind a generally pure distillate. In some embodiments, the distillation system can be used in a multiple unit application, so if one distillation system has a failure, an additional unit in the multiple unit application can be used to continue the distillation so the distillation process can continue.

As an exemplary use, the process to extract oil from a biomass can be achieved in various ways. Cannabis is a non-limiting example where CBD oil or THC oil is extracted from a cannabis biomass. Embodiments of the invention can be used to distil a solvent soaked cannabis biomass so the oil and solvent can be separated from each other. Current solvent/oil mixture distillation systems are exclusively a two-step/two machine process that require a large single quantity batch process of distillation using only heat. This requires a large vat and a large chiller. The first step is a simple distillation process that extracts about 80 to 90 percent of the solvent. The single quantity batch process then needs to be transferred to another container. The next step is to perform a known distillation process using heat and vacuum in a smaller single quantity batch. The goal of this smaller single quantity batch process is to bring the solvent extraction to about 95 percent. This current process is used to produce an oil that is used to make products for sale, or it can be refined further to customer specifications if needed. Each of these pieces of equipment can range from $30,000 to $50,000 as a representative example.

Some embodiments of the distillation system 100 can automatically draw the biomass into the distillation chamber, and by using heat, vacuum, and the novel splash agitation process all in one step, and all in one distillation chamber, the distillation system can complete the process of getting the biomass to the 95 percent extraction of the solvent, or more or less, as desired. By incorporating the spinner apparatus into the distillation system, the distillation process using the novel distillation system requires only the one distillation system as compared to two pieces of expensive equipment, and the distillation results are better than the two-step/two-piece equipment, at a fraction of the cost to the end user.

The methods shown and described herein may be used in conjunction with any of the systems or devices shown and described above and in the Figures, among others. In various embodiments, some of the method elements shown may be performed concurrently, in a different order than shown, or may be omitted. Additional method elements may also be performed as desired.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Within this specification, embodiments have been described in a way which enables a clear and concise specification to be written, but it is intended and will be appreciated that embodiments may be variously combined or separated without parting from the embodiments described. For example, it will be appreciated that all preferred features described herein are applicable to all aspects of the embodiments described herein.

Thus, while the embodiments have been described in connection with particular embodiments and examples, the disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the disclosure are set forth in the following claims.

We claim:

1. A distillation system comprising:
    a distillation chamber for distilling a biomass, the distillation chamber including an intake hole for the biomass, an outlet for a distillate, and a vapor outlet hole for a vaporized solvent;
    a heat source to produce heat, the heat from the heat source to be applied to the distillation chamber to heat the biomass;
    a source of vacuum, the vacuum to be applied to the distillation chamber through the vapor outlet hole to remove the vaporized solvent from the distillation chamber;
    a magnetically driven spinner apparatus, the magnetically driven spinner apparatus positioned within the distillation chamber and including:
        at least a first spinner magnet;
        at least a first paddle for generating a splash agitation of the biomass in the distillation chamber;
        a shaft;
        a driven magnet support bar coupled to an upper portion of the shaft;
        the at least a first spinner magnet and at least a second spinner magnet coupled to the driven magnet support bar;
        a paddle support bar coupled to a lower portion of the shaft; and
        the at least a first paddle and at least a second paddle coupled to the paddle support bar; and
    a magnetic drive assembly, the magnetic drive assembly including a motor and at least a first drive magnet movable by the motor;
    wherein a magnetic field is generated between the first spinner magnet and the first drive magnet and through the distillation chamber such that rotational movement of the first drive magnet causes the first spinner magnet to follow the rotational movement of the first drive magnet and the magnetic field, which causes the magnetically driven spinner apparatus to spin within the distillation chamber as the first drive magnet rotates; and
    wherein neither of the magnetic drive assembly and the magnetically driven spinner apparatus extend through any wall of the distillation chamber.

2. The distillation system of claim 1, further including at least a second paddle for generating the splash agitation of the biomass in the distillation chamber.

3. The distillation system of claim 1, further including a bearing apparatus positioned on the shaft; and
    the bearing apparatus supported by a receiver in the distillation chamber to allow the shaft to maintain a location of the shaft in a center position of the distillation chamber and spin within the distillation chamber.

4. The distillation system of claim 1, wherein the distillation chamber includes a cover, the cover further including a float switch hole and vapor probe hole, the float switch hole to hold a float switch located in the distillation chamber, and the vapor probe hole to hold a vapor temperature sensor.

5. The distillation system of claim 1, wherein the first paddle includes a top surface, an inner side surface, an outer side surface, a bottom surface, a first ramped surface extending downward from the top surface, and a second ramped surface opposite the first ramped surface extending downward from the top surface, the top surface and/or the bottom surface including one or more shape variations to direct and agitate the flow of the biomass across the top surface and/or the bottom surface.

6. The distillation system of claim 1, wherein the magnetic drive assembly further includes a shaft coupled to the motor;
a magnet support bar coupled to a portion of the shaft; and
the at least a first drive magnet and at least a second drive magnet coupled to the magnet support bar.

7. A distillation system comprising:
a distillation chamber for distilling a biomass, the distillation chamber including an intake hole for the biomass, an outlet for a distillate, and a vapor outlet hole for a vaporized solvent;
a heat source to produce heat, the heat from the heat source to be applied to the distillation chamber to heat the biomass;
a source of vacuum, the vacuum to be applied to the distillation chamber through the vapor outlet hole to remove the vaporized solvent from the distillation chamber; and
a spinner apparatus, the spinner apparatus positioned within the distillation chamber and including a shaft, a paddle support bar coupled to the shaft, and at least a first paddle and a second paddle coupled to the paddle support bar, and a bearing apparatus positioned on the shaft below the paddle support bar supported by a receiver in the distillation chamber to allow the shaft of the spinner apparatus to maintain a location of the shaft of the spinner apparatus in a center position of the distillation chamber and spin within the distillation chamber;
wherein the at least a first paddle includes a first paddle top surface, and at least a first paddle first ramped surface extending downward from the first paddle top surface, and the at least a second paddle includes a second paddle top surface, and at least a second paddle first ramped surface extending downward from the second paddle top surface;
wherein at least one of the first paddle top surface and the second paddle top surface include at least one shape variation to direct the flow of the biomass across the at least one of the first paddle top surface and second paddle top surface; and
a drive assembly, the drive assembly including a motor to cause rotational movement of the spinner apparatus within the distillation chamber.

8. The distillation system of claim 7, further including a predefined space between the at least a first paddle and an inside surface of the distillation chamber, such that the at least a first paddle does not contact the inside surface of the distillation chamber.

9. The distillation system of claim 7, wherein the spinner apparatus includes at least a first spinner magnet, and the drive assembly includes at least a first drive magnet; and
a magnetic field generated between the at least a first spinner magnet and the at least a first drive magnet and through the distillation chamber such that rotational movement of the at least a first drive magnet causes the at least a first spinner magnet to follow a movement of the magnetic field, which causes the spinner apparatus to spin within the distillation chamber as the at least a first drive magnet rotates.

10. The distillation system of claim 7, wherein the first paddle includes a top surface, an inner side surface, an outer side surface, a bottom surface, a first ramped surface extending downward from the top surface, and a second ramped surface opposite the first ramped surface extending downward from the top surface, the top surface and/or the bottom surface including one or more shape variations to direct and agitate the flow of the biomass across the top surface and/or the bottom surface.

11. The distillation system of claim 10, wherein the one or more shape variations include at least one of one or more ribs on the top surface with gaps positioned between the ribs, and one or more cavities within the bottom surface.

12. The distillation system of claim 10, wherein the one or more shape variations include one or more angled blades extending upward from the top surface, and/or one or more angled blades extending downward from the bottom surface.

13. The distillation system of claim 10, wherein the spinner apparatus rotates within the distillation chamber, and the at least a first paddle and the second paddle move through the biomass to scoop the biomass up and direct it across and through the one or more shape variations to produce a centrifugal force on the biomass and an agitation of the biomass to move the biomass within the distillation chamber.

14. The distillation system of claim 7, wherein the at least a first paddle is heated via a fluid flow through a channel formed in the at least a first paddle.

15. A distillation system comprising:
a distillation chamber for distilling a biomass, the distillation chamber including an intake hole for the biomass, an outlet for a distillate, and a vapor outlet hole for a vaporized solvent;
a heat source to produce heat, the heat from the heat source to be applied to the distillation chamber to heat the biomass;
a source of vacuum, the vacuum to be applied to the distillation chamber through the vapor outlet hole to remove the vaporized solvent from the distillation chamber;
a magnetically driven spinner apparatus, the magnetically driven spinner apparatus positioned within the distillation chamber and including at least a first spinner magnet, and at least a first paddle for generating a splash agitation of the biomass in the distillation chamber; and
a magnetic drive assembly, the magnetic drive assembly including a motor, at least a first drive magnet movable by the motor, a shaft coupled to the motor, and a magnet support bar coupled to a portion of the shaft, the at least a first drive magnet and at least a second drive magnet being coupled to the magnet support bar;
wherein a magnetic field is generated between the first spinner magnet and the first drive magnet and through the distillation chamber such that rotational movement of the first drive magnet causes the first spinner magnet to follow the rotational movement of the first drive magnet and the magnetic field, which causes the magnetically driven spinner apparatus to spin within the distillation chamber as the first drive magnet rotates; and
wherein neither of the magnetic drive assembly and the magnetically driven spinner apparatus extend through any wall of the distillation chamber.

16. The distillation system of claim 15, wherein the magnetically driven spinner apparatus further includes a shaft;
a paddle support bar coupled to a lower portion of the shaft and supporting the at least a first paddle.

17. The distillation system of claim 16, wherein the magnetically driven spinner apparatus further includes a driven magnet support bar that is coupled to an upper portion of the shaft and that supports the at least a first spinner magnet.

18. The distillation system of claim 16, further including a bearing apparatus positioned on the shaft; and the bearing apparatus supported within the distillation chamber to allow the shaft to maintain a location of the shaft and spin within the distillation chamber.

19. The distillation system of claim 15, wherein the at least a first paddle includes a first paddle top surface having at least one shape variation to direct the flow of the biomass across the first paddle top surface.

20. The distillation system of claim 19, wherein the at least one shape variation includes an angled blade extending away from the top surface.

\* \* \* \* \*